(12) United States Patent
Taghipour

(10) Patent No.: US 11,584,663 B2
(45) Date of Patent: *Feb. 21, 2023

(54) UV-LED RADIATION PHOTODETECTOR

(71) Applicant: THE UNIVERSITY OF BRITISH COLUMBIA, Vancouver (CA)

(72) Inventor: Fariborz Taghipour, Burnaby (CA)

(73) Assignee: The University of British Columbia, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/851,327

(22) Filed: Apr. 17, 2020

(65) Prior Publication Data
US 2020/0317538 A1 Oct. 8, 2020

Related U.S. Application Data

(63) Continuation of application No. 15/922,667, filed on Mar. 15, 2018, now Pat. No. 10,640,397, which is a
(Continued)

(51) Int. Cl.
*C02F 1/32* (2006.01)
*C02F 1/72* (2023.01)
*C02F 103/02* (2006.01)

(52) U.S. Cl.
CPC .............. *C02F 1/325* (2013.01); *C02F 1/725* (2013.01); *C02F 1/32* (2013.01);
(Continued)

(58) Field of Classification Search
CPC .... C02F 1/32; C02F 1/325; C02F 2201/3222; C02F 2201/3228
See application file for complete search history.

(56) References Cited

U.S. PATENT DOCUMENTS

| 5,696,380 A | 12/1997 | Cooke et al. |
| 6,447,720 B1 | 9/2002 | Horton, III et al. |

(Continued)

FOREIGN PATENT DOCUMENTS

| CN | 103133915 A | 6/2013 |
| DE | 102010047318 | 4/2012 |

(Continued)

OTHER PUBLICATIONS

U.S. Appl. No. 14/523,851, Final Office Action dated Mar. 22, 2016, 24 pages.
(Continued)

*Primary Examiner* — Bradley R Spies
(74) *Attorney, Agent, or Firm* — Kilpatrick Townsend & Stockton LLP

(57) ABSTRACT

A reactor that operates with ultraviolet light emitting diodes (UV-LEDs) to attain UV photoreactions or UV photo-initiated reaction in a fluid flow for various applications, including water purification. The UV-LED reactor is comprised of a conduit means for passing fluid flow, an ultraviolet light emitting diode (UV-LED), and a radiation-focusing element to focus the UV-LED radiation to the fluid in the longitudinal direction of the conduit. The UV-LED reactor may include photocatalysts or chemical oxidants, which are activated by UV emitted by UV-LEDs for photocatalytic and photo-initiated reactions.

20 Claims, 49 Drawing Sheets

Related U.S. Application Data continuation of application No. 14/523,851, filed on Oct. 25, 2014, now Pat. No. 9,938,165.

(60) Provisional application No. 61/896,554, filed on Oct. 28, 2013.

(52) U.S. Cl.
CPC .............. *C02F 2103/026* (2013.01); *C02F 2201/3222* (2013.01); *C02F 2201/3228* (2013.01); *C02F 2307/10* (2013.01); *C02F 2307/12* (2013.01)

(56) References Cited

U.S. PATENT DOCUMENTS

| | | | |
|---|---|---|---|
| 6,454,937 B1 * | 9/2002 | Horton | A61L 2/10 210/192 |
| 6,803,586 B1 | 10/2004 | Brunet et al. | |
| 6,940,075 B2 | 9/2005 | Schulz | |
| 6,972,415 B2 | 12/2005 | Schaible et al. | |
| 7,309,409 B2 | 12/2007 | Amirkhanian et al. | |
| 7,408,174 B2 | 8/2008 | From et al. | |
| 7,498,004 B2 | 3/2009 | Saccomanno | |
| 7,641,790 B2 | 1/2010 | Maiden | |
| 7,862,728 B2 | 1/2011 | Yencho | |
| 7,910,899 B2 | 3/2011 | Platsch | |
| 8,088,289 B2 | 1/2012 | Tribelsky | |
| 8,322,199 B2 | 12/2012 | Reed | |
| 8,324,595 B2 | 12/2012 | Takahashi et al. | |
| 8,420,022 B2 | 4/2013 | Soler et al. | |
| 8,444,918 B2 | 5/2013 | Tanaka | |
| 8,506,886 B2 | 8/2013 | Owen et al. | |
| 8,673,218 B2 | 3/2014 | Jaffe et al. | |
| 8,722,396 B2 | 5/2014 | Kassebaum et al. | |
| 9,044,521 B2 | 6/2015 | Farren | |
| 9,174,858 B2 | 11/2015 | Ma et al. | |
| 9,260,323 B2 | 2/2016 | Boodaghians et al. | |
| 2002/0080615 A1 | 6/2002 | Marshall et al. | |
| 2002/0144955 A1 | 10/2002 | Barak et al. | |
| 2003/0170151 A1 * | 9/2003 | Hunter | H05B 3/0052 422/186.3 |
| 2005/0242013 A1 | 11/2005 | Hunter et al. | |
| 2006/0131246 A1 | 6/2006 | Ehlers, Sr. | |
| 2006/0283786 A1 | 12/2006 | Harbers | |
| 2007/0099292 A1 | 5/2007 | Miller et al. | |
| 2008/0003171 A1 | 1/2008 | Smith et al. | |
| 2008/0225528 A1 | 9/2008 | Holder et al. | |
| 2008/0286163 A1 | 11/2008 | Garfield et al. | |
| 2009/0230038 A1 | 9/2009 | Tanaka et al. | |
| 2010/0178201 A1 | 7/2010 | Tribelsky et al. | |
| 2010/0237254 A1 | 9/2010 | Mason et al. | |
| 2010/0291502 A1 | 11/2010 | Knight | |
| 2011/0291995 A1 | 12/2011 | Shr et al. | |
| 2012/0070335 A1 | 3/2012 | Carey | |
| 2012/0128539 A1 | 5/2012 | Gross et al. | |
| 2012/0298592 A1 | 11/2012 | Boal et al. | |
| 2013/0236353 A1 | 9/2013 | Blechschmidt et al. | |
| 2014/0202962 A1 | 7/2014 | Bilenko et al. | |
| 2015/0008167 A1 | 1/2015 | Shturm et al. | |
| 2015/0064069 A1 | 3/2015 | Yi et al. | |
| 2015/0129776 A1 | 5/2015 | Boodaghians et al. | |
| 2015/0144575 A1 * | 5/2015 | Hawkins, II | C02F 1/325 210/748.11 |
| 2015/0158741 A1 | 6/2015 | Lee et al. | |

FOREIGN PATENT DOCUMENTS

| | | |
|---|---|---|
| WO | 2009013507 | 1/2009 |
| WO | 2011092541 | 8/2011 |
| WO | 2012010645 | 1/2012 |
| WO | 2014058011 | 4/2014 |
| WO | 2015000756 | 1/2015 |

OTHER PUBLICATIONS

U.S. Appl. No. 14/523,851, Non-Final Office Action dated Aug. 18, 2015, 15 pages.
U.S. Appl. No. 14/823,851, Non-Final Office Action dated Mar. 28, 2017.
Flis, Development of an Inclined Orientation UV System Permits Smaller Footprints, Available online at: https://cdn.ymaws.com/www.ncsafewater.org/resource/collection/DA8375FB-1514-4325-9CF6-0369B08C4385/WW_Tues_PM_03.20_Flis_PAPER.pdf, 2014, 10 pages.
Gandhi, Visualization and Quantification of Hydrodynamics and Dose in UV Reactors by 3d Laser-induced Fluorescence, Available online at: https://smartech.gatech.edu/bitstream/handle/1853/45895/gandhi_varun_n_201212_phd.pdf?sequence=1&isAllowed=y, Dec. 2012, 207 pages.
Jenny et al., Heuristic Optimization of a Continuous Flow Point-of-use UV-LED Disinfection Reactor Using Computational Fluid Dynamics, Water Research, vol. 83, Jun. 23, 2015, pp. 310-318.
Jenny et al., Modeling a Continuous Flow Ultraviolet Light Emitting Diode Reactor Using Computational Fluid Dynamics, Chemical Engineering Sciences, vol. 116, May 28, 2014, pp. 524-535.
Jenny et al., Numerical Optimization and Experimental Validation of a Continuous Flow Point-of-Use UV-LED Disinfection Reactor using Computational Fluid Dynamics., 2014, 142 pages.
Joel et al., Hydrodynamic Characterization of UV Reactors, North Carolina State University, Jan. 23, 2006.
Kneissl et al., Development of UV-LED Disinfection, Available online at: https://publications.kompetenz-wasser.de/pdf/Kneissl-2010-362.pdf, 2010, 36 pages.
Oguma et al., Application of UV Light Emitting Diodes to Batch and Now-through Water Disinfection Systems, Desalination, vol. 328, Nov. 1, 2013, pp. 24-30.
Saha, Numerical Simulation of an Open Channel Ultraviolet Wastewater Disinfection Reactor, Available online at: https://ir.lib.uwo.ca/cgi/viewcontent.cgi?article=2937&context=etd, Aug. 2013, 100 pages.

\* cited by examiner

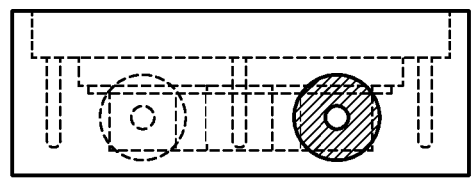
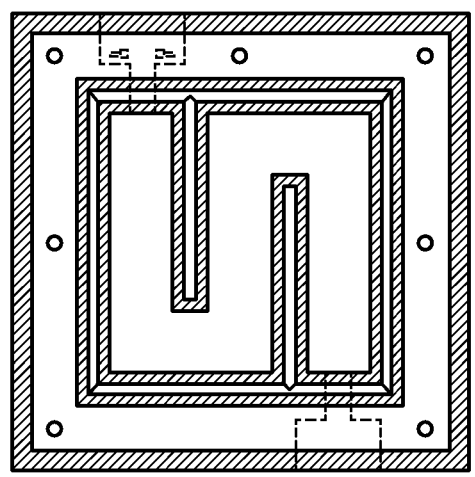
FIG. 29

UV-LED RADIATION PHOTODETECTOR

CROSS-REFERENCE TO RELATED APPLICATIONS

This application is a continuation of U.S. application Ser. No. 15/922,667, filed Mar. 15, 2018, which is a continuation of U.S. application Ser. No. 14/523,851, filed Oct. 25, 2014, which issued as U.S. Pat. No. 9,938,165 which claims the benefit of U.S. Provisional Application No. 61/896,554, filed Oct. 28, 2013, the entire disclosures of which are incorporated herein by reference.

BACKGROUND OF THE INVENTION

The present invention relates to ultraviolet (UV) reactors, and more particularly, to a UV reactor operating with ultraviolet light emitting diode (UV-LED).

Ultraviolet (UV) reactors—reactors that contains UV radiation—are applied to many photoreactions, photocatalytic reactions, and photo-initiated reactions. One of the main applications of UV reactors is for water and air purification. In particular, UV reactors have emerged in recent years as one of the best water treatment alternatives. UV reactor systems currently operating use low- and medium-pressure mercury lamps.

Light emitting diodes (LEDs) emit radiation of a single wavelength. With recent advances in LED technology, they may be designed to generate UV radiation at different wavelengths, which include the wavelength for DNA absorption as well as a wavelength that can be used for photocatalyst activation. UV-LEDs have many advantages compared to traditional mercury UV lamps, including a compact and robust design, lower voltages and power requirements, and the ability to turn on and off with high frequency. The UV-LEDs advantages make them an attractive alternative for replacing UV lamps in UV reactor systems. This replacement also makes possible the development of novel UV reactors with new applications.

The performance of UV-LED reactors (reactors that operate with UV-LEDs as a source of UV radiation) may significantly improve with optimizations to the reactor geometry, the reactor hydrodynamics, and UV radiation distribution. Unlike UV lamps, UV-LEDs are radiation sources with individual small sizes. They may be positioned in a reactor with a higher degree of freedom compared to the arrangement of UV lamps.

SUMMARY OF THE INVENTION

A new UV-LED reactor concept with precise control of both the fluidic and optical environments, which would provide high and uniform radiation exposure to a fluid flow at a small footprint, is of great interest to the UV reactor industry. Such an efficient and compact UV-LED reactor will make it capable of being incorporated into some devices for various UV photoreaction applications, including UV-based water treatment.

In one aspect, the present invention is an ultraviolet (UV) reactor comprising a conduit for transporting fluid flow; an ultraviolet light emitting diode (UV-LED); and a radiation-focusing element. The fluid flow moves in the longitudinal direction of the conduit and is irradiated in the longitudinal direction of the conduit by UV-LED radiation that is passed through the focusing element.

The UV reactor may be a fluid treatment reactor, such as water treatment reactor. Further, the reactor may be a water treatment reactor of an appliance or a healthcare device. The focusing element of the reactor may be a focusing lens disposed proximate to the UV LED. The focusing lens may be a collimating lens, or a collimating lens and a converging lens. The UV-LED and the collimating lens may be arranged, such that UV-LED radiation that is emitted into the fluid flow in the conduit extensively covers the transverse cross-section of the conduit. Further the reactor may be array of conduits, wherein the fluid flow in at least one conduit is irradiated by one or more UV-LEDs. The UV-LED may be positioned at a longitudinal end of the conduit. The UV-LED reactor may contain several UV-LEDs that emit different UV wavelengths. The UV reactor may contain a photocatalyst supported on a structure in the reactor; it may also contain a chemical reagent that is added to the reactor. The UV-LED may be turned on and off automatically by an external signal. The reactor may contain an element to restrain the fluid flow in the conduit, such as a static mixer.

In another aspect, the present invention is a method of attaining UV photo reaction or UV photo-initiated reaction in a fluid flow. This is accomplished through passing the fluid flow in the longitudinal direction of a conduit; focusing the ultraviolet radiation from an ultraviolet light emitting diode (UV-LED) by means of a focusing element, such as a collimating lens; and emitting the focused ultraviolet radiation from the UV-LED in the longitudinal direction of the conduit. A photocatalyst may be used to promote photocatalytic reactions in the fluid.

In yet another aspect, the present invention is a method for the treatment of a fluid, such as water or air. This is accomplished through passing the fluid flow in the longitudinal direction of a conduit; focusing the ultraviolet radiation from an ultraviolet light emitting diode (UV-LED) by means of a focusing element, such as a collimating lens; and emitting the focused ultraviolet radiation from the UV-LED in the longitudinal direction of the conduit. The microbial and chemical contaminants in the fluid flow may be eliminated while the ultraviolet radiation is emitted into the fluid flow.

The following will describe, in detail, several variations of the present invention.

The efficiency of a UV reactor is determined by the total UV fluence, which is the radiant exposure delivered to a fluid in the reactor. The UV fluence is the product of the UV fluence rate, which is the incident radiant power, and the exposure time. The fluence rate in a UV reactor may be controlled by adjusting the UV-LED radiation pattern in the reactor, while the exposure time may be controlled by adjusting the reactor hydrodynamics. The UV-LED reactor of the present invention offers high reactor performance through its precise control of both the radiation pattern and the hydrodynamics. Further, the UV-LED reactor of the present invention provides high efficiency by increasing uniformity in UV fluence distribution to the fluid and by delivering the majority of UV radiation directly to the fluid, instead of losing the UV radiant energy to the reactor wall.

In one variation, the present invention is a reactor operating with one or more ultraviolet light emitting diodes (UV-LEDs) in order to cause photoreactions or photo-initiated reactions in a fluid. The UV-LED reactor comprises a single or series of flow channels (conduit, tube), which is irradiated, either with one UV-LED, or with an array of them. The reactor may comprise a single flow channel, a series of parallel flow channels, or a stack of multiple flow channels. In a multi-channel reactor, the fluid flow may go through the channels in parallel or in series (fluid flow going from one channel to another, where the flow channels are connected at one end). The fluid flow is moving mainly in the longitudinal direction of the channels. The UV-LED radiation is focused through a focusing element, such as a collimating lens. The fluid flowing in the reactor channels is irradiated by focused radiation from the UV-LEDs in the longitudinal direction of the channels. The LEDs may be positioned at one or both ends of the flow channels. The total UV dose delivered to a fluid may be controlled by adjusting the flow rate and/or regulating UV-LED power, and/or turning on/off the number of UV-LEDs. The reactor configuration of the present invention makes the design and fabrication of an efficient and compact UV reactor with all-integrated components possible.

In one variation of the present invention, the focusing element is a focusing lens, such as a collimating or a converging lens, disposed proximate to the UV-LED. This lens may be either a stand-alone lens or a lens integrated into the UV-LED device. The lens may be made of quartz or another UV transparent material. A combination of a collimating lens and a converging lens may also be used. Applying a collimating lens to focus the radiation into the reactor channels causes minimal attenuation of the UV energy through the reactor length and negligible UV energy loss to the reactor channel walls. This particular configuration of the UV-LED reactor, which involves collimating the UV-LED radiation, may results in an effective utilization of UV-LED radiant power, and may lead to a superior reactor performance.

In another variation of the present invention, one or more photocatalysts may be used in the UV-LED reactor to be activated by UV, which would then form oxidative hydroxyl radicals, as well as other active radicals. The photocatalyst may be any combination of different photocatalysts, catalyst supports, and co-catalysts. This configuration may result in photocatalytic or photo-initiated oxidation/reduction reactions. The photocatalysts may be supported on a structure, such as a solid substrate, a porous substrate, mesh, screen, metal foam, cloth, or a combination thereof. The photocatalysts that are supported on different solid or perforated substrates may be positioned in the flow channels. In particular, a UV-LED reactor containing a photocatalyst on a perforated support substrate in the cross section of the reactor channel, irradiated with collimated UV radiation from a UV-LED, will efficiently utilize the UV-LED radiation. This configuration may result in a highly effective UV-LED photocatalytic reactor.

In another variation of the present invention, static mixers and vortex generators may be used in the flow channels to increase mixing and/or to rotate the flow as it goes through the flow channels. This configuration may result in enhanced UV-LED reactor performance by delivering a more uniform UV dose or by improving mass transfer near the photocatalyst surface (provided that photocatalyst presents in the reactor).

In another variation of the present invention, UV-LEDs that emit UV radiation of different wavelengths may be used. This configuration may result in a synergistic effect and increase the rate of photoreactions and photocatalytic reactions.

In another variation of the present invention, the LEDs may operate in a pulsed mode (likely at high frequencies). This mode of operation may affect the photoreaction rate as well as the photocatalyst's electron-hole recombination, and thereby increase photocatalytic efficiencies.

In another variation of the present invention, the LEDs may be programmed to turn on and off automatically, for example, as the fluid flow starts or stops moving in the reactor, or at specific time intervals. For controlling UV-LEDs' on/off status, a sensor may be used to detect the fluid motion or the like. This configuration may result in saving energy used by the reactor.

In another variation of the present invention, the LEDs may be programmed to adjust their power output, or to turn some of the LEDs on and off automatically by receiving a signal. The signal may be generated, for example, as the flow rate or as the quality of the fluid passing through the UV-LED reactor changes. This configuration may result in providing appropriate radiation energy to the fluid based on any particular operating conditions.

In another variation of the present invention, the fluid flowing through the channels may be used to transfer the heat generated by the LEDs. This may be achieved by using part of the fluid to be circulated in the proximity of the LEDs or their circuit board. This may also be achieved by using highly thermal conductive material, as the LED board connected to flow channel walls is also made of highly thermal conductive material. This configuration may improve thermal management and the lifetime of the UV-LEDs.

While the UV-LED reactor of the present invention may be used for many photoreactions, photocatalytic reactions, and photo-initiated reactions, one of the main applications is the purification of water or purification of other UV-transparent fluids.

In another variation, the present invention is a UV-LED reactor that uses a focusing element to focus UV radiation of a UV-LED into the water flow as it moves through the reactor flow channel for water purification. Water treatment may be achieved by the inactivation of microorganisms (e.g., bacteria and viruses) and the degradation of micropollutants, such as chemical contaminants (e.g., toxic organic compounds), by direct photoreactions, and/or photocatalytic reactions, and/or photo-initiated oxidation reactions. Water may flow through the UV-LED reactor by the use of a fluid-moving device, such as an electrical pump. The UV-LEDs are preferably powered by a wall plug or a battery. If applicable, a photocatalyst may be immobilized on a solid substrate, where the fluid passes over, or on a perforated substrate where the fluid passes through. The photocatalyst may be titanium dioxide $TiO_2$, or other photocatalysts. If applicable, chemical reagents, such as chemical oxidants may be injected into the UV reactor. The chemical oxidant may be hydrogen peroxide $H_2O_2$, ozone $O_3$, or other chemicals.

In one variation of the present invention, the UV-LED water purification reactor is incorporated in appliances that dispense or use water for consumption. The UV-LED reactor treats the water that is used in the appliances, such as refrigerators, freezers, water coolers, coffee makers, wending machines, and the like. The water may be pure water or water-based fluids such as coffee. The UV-LEDs of the reactor may be turned on and off automatically as the water starts or stops flowing. A UV-LED reactor that is incorporated in appliances, such as water coolers and refrigerators is an effective technique to reduce the microbial contamination in the water leaving the waterline (for consumption) and to reduce the risk for infection.

In another variation of the present invention, the UV-LED water purification reactor is incorporated in a healthcare device. The UV-LED reactor treats the water used in or by the health care devices, such as hemodialysis devices (hemodialysis machine) or colon hydrotherapy equipment. The UV-LED reactor may be integrated in these devices/equipment along with other forms of water purification methods such as filtration.

These and other features, aspects, and advantages of the present invention will become better understood with reference to the following drawings, description and claims.

BRIEF DESCRIPTION OF THE DRAWINGS

FIGS. 25A and 24B are side views of UV-LED reactors, where stacks of rectangular (FIG. 25A) and triangular (FIG. 25B) flow channels are irradiated by LEDs parallel to the direction of the flow, of the present invention; the dotted lines show the third dimension;

FIG. 29 is engineering drawings of the UV-LED reactor shown in FIG. 27;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1A:
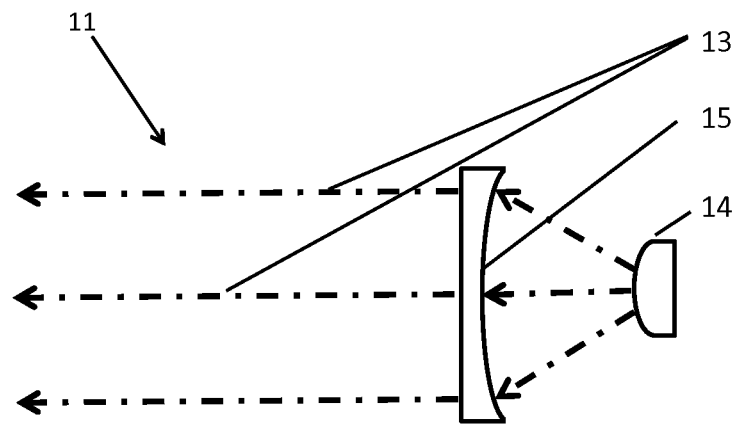
FIG. 1A illustrates the schematic of UV-LED radiant beams from a collimating optical lens.
Figure 1B:
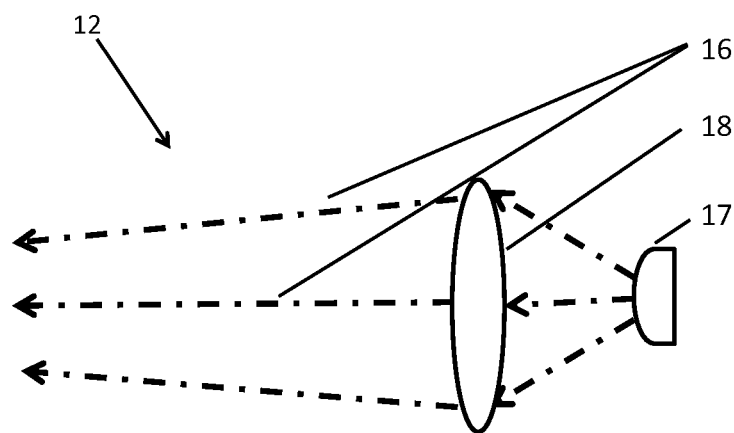
FIG. 1B illustrates the schematic of UV-LED radiant beams from a converging optical lens.

Referring to FIG. 1A-1B, there are shown the side views of the schematics of UV-LED collimated radiation 11 (in FIG. 1A) and converged radiation 12 (in FIG. 1B). Referring to FIG. 1A, there is shown a side view of radiant beams 13 emitted from an LED 14 after passing through a collimating lens 15. Referring to FIG. 1B, there is shown the side view of radiant beams 16 emitted from an LED 17 after passing through a converging lens 18. The arrows indicate the main direction of the radiant beams.

For the invention described in the following figures, FIG. 2 to FIG. 10, the LEDs' radiation pattern is focused by applying appropriate optical lenses that are either integrated in, or disposed close to, the UV-LEDs. The optical lenses used for focusing UV-LED radiation in several of the following figures, FIG. 2 to FIG. 10, are not shown for the sake of simplicity, as well as for clearer visualization of the reactor concepts.

Figure 2:
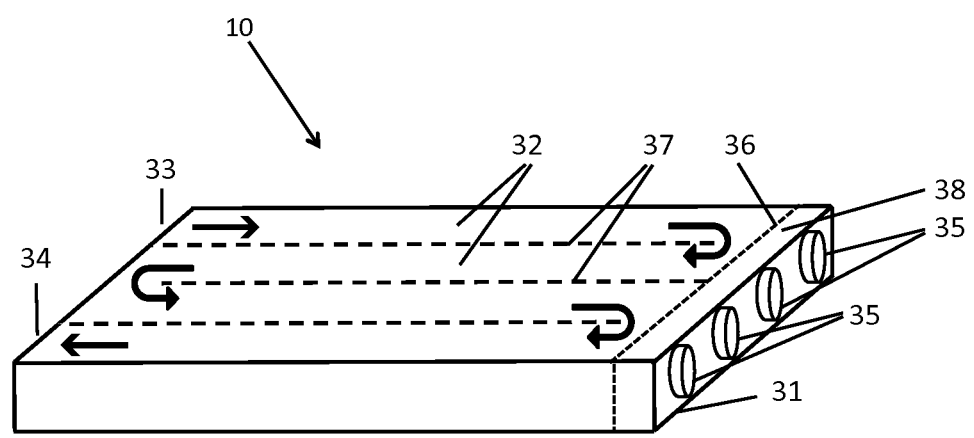
FIG. 2 is a partially-diagrammatic perspective view of a UV-LED reactor of the present invention.
Figure 3:
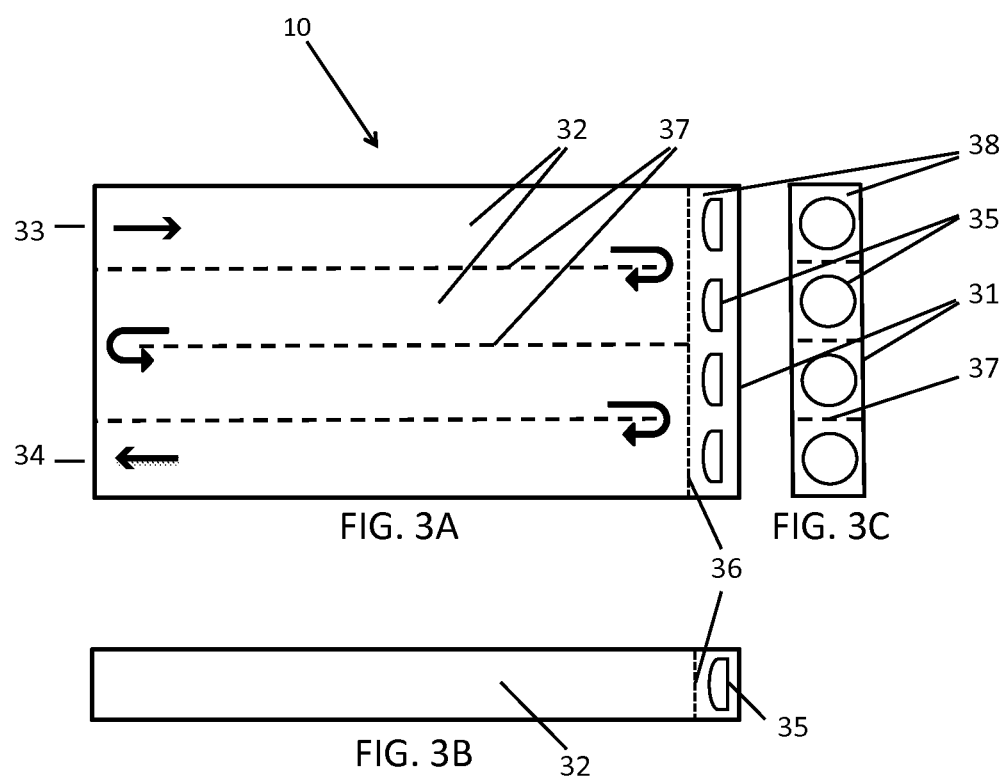
FIG. 3A is a partially-diagrammatic top view of the UV-LED reactor shown in FIG. 2.
FIG. 3B is a partially-diagrammatic side view of the UV-LED reactor shown in FIG. 2.
FIG. 3C is a partially-diagrammatic side view of the UV-LED reactor shown in FIG. 2.

Referring now to the invention in more detail in FIG. 2 and FIG. 3, there are shown a perspective view (FIG. 2), a top view (FIG. 3A), and side views (FIG. 3B and FIG. 3C) of a UV-LED reactor according to an exemplary embodiment of the present invention. There is shown a UV-LED reactor 10 having a housing 31, flow channels 32 with channel walls 37, an inlet 33 for fluid (e.g., water) to enter and an outlet 34 for fluid to exit, one or more LEDs 35 placed in LED housing 38, and a UV-transparent window 36, such as a quartz window. The LEDs may be mounted on a circuit board (not shown to keep the drawing simple). There may be one or more heat sinks, drive circuits for UV-LEDs, microcontrollers and other electronic mechanisms, a power port, and an on/off switch (none is shown here to keep the drawing simple). Different lenses, including collimating, converging, and other lenses (not shown), are disposed in the reactor in front of the UV-LEDs to focus the UV-LED radiation pattern. Two adjacent flow channels are connected at one end of some flow channels for the fluid to go from one channel to another channel (the fluid goes through multi-passes through the rector). The main fluid flow directions are shown by the arrows, showing the fluid flow enters the reactor from inlet 33, flow through the reactor channels and turns at the end of some of the channels and exits from outlet 34.

Still referring to the invention of FIG. 2 and FIG. 3 in more detail, the fluid flows in and out of the UV-LED reactor, passes through the channels, and is irradiated by UV radiation from UV-LEDs. The LED(s) are positioned at one end of the flow channel. The main direction of the radiant beams and of the flow are along the longitudinal direction of the reactor channels. The internal wall of the channels can be made of or be coated with material with high UV reflectivity to reflect to the fluid any part of the radiation that is emitted to the channel walls. Using a collimating lens may be particularly advantageous for this design to keep the radiation intensity relatively high through the flow channel. The reactor may be used for attaining UV photoreaction in a fluid flow. The reactor may also be used for the treatment of a fluid, such as treatment of water. The UV-LEDs may be turned on and off automatically by an external signal, such as a signal from a device that detects the fluid flow rate.

Figure 4:
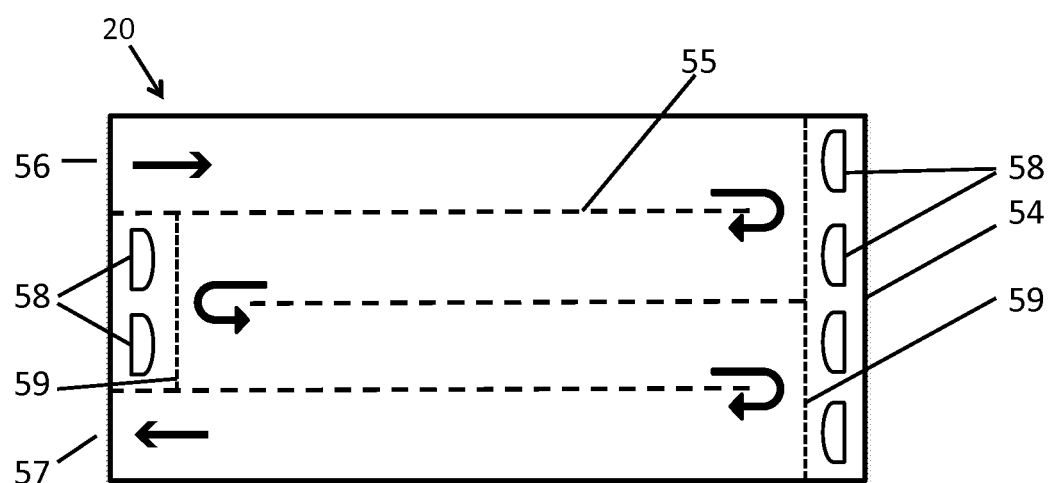
FIG. 4 is a partially-diagrammatic top view of a UV-LED reactor of the present invention.

Referring now to FIG. 4, there is shown a UV-LED reactor according to an exemplary embodiment of the present invention. In FIG. 4, there is shown the top view of a UV-LED reactor 20, having a housing 54, flow channel walls 55, an inlet 56 for fluid (e.g., water) to enter and an outlet 57 for fluid to exit, LEDs 58, and a UV-transparent window 59. The UV-LED reactor is a multi-channel reactor where the fluid flow is irradiated by the LEDs in some of the channels from one end (the two channels on the sides) and in some of the channels from two ends (the two channels in the middle), as the fluid flow moves through the reactor channels. The main fluid flow directions are shown by the arrows.

Referring now to FIGS. 5A-5E, there are shown the side views of several single channel UV-LED reactor configurations according to an exemplary embodiment of the present invention. In general, these configurations may be applied to both single and multi-channel UV-LED reactors. The inlet and outlet orientations and their fluid flow directions may be different for a multi-channel reactor compared to those for a single-channel reactor. The straight black arrows indicate the main direction of the flow, both in the reactors and in the inlet and outlet of the reactors.

Figure 5A:
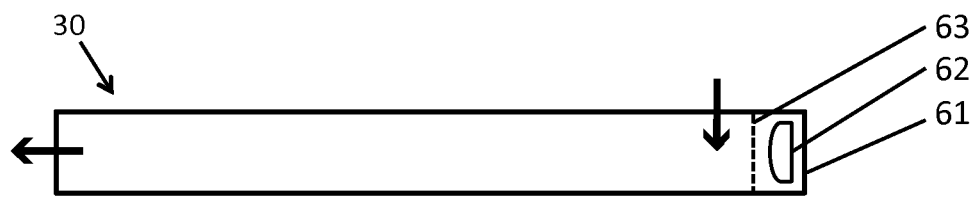
FIGS. 5A-5E are partially-diagrammatic side views of various variations of UV-LED reactor of the present invention.

Referring now to FIG. 5A, there is shown the side view of a UV-LED reactor 30 having a housing 61, a UV-LED 62, and a UV-transparent window 63. This single-channel reactor is irradiated from one end of the flow channel, offering the flexibility of the outlet direction. A chemical reagent (not shown) may be added to the reactor along with the fluid flow to cause some desirable photoreactions.

Figure 5B:
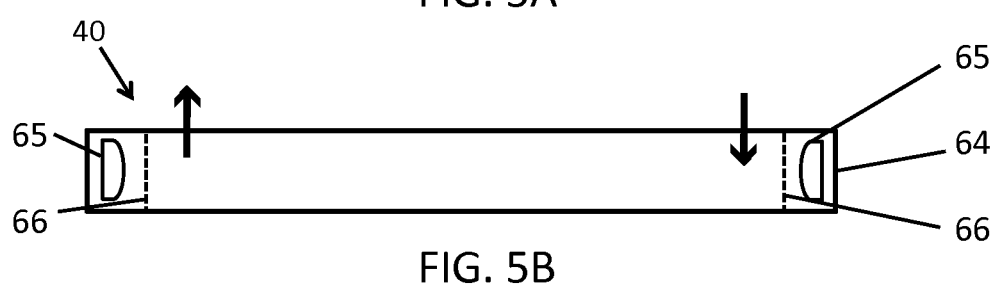

Referring now to FIG. 5B, there is shown the side view of a UV-LED reactor 40 having a housing 64, UV-LEDs 65, and UV-transparent windows 66. This single-channel reactor is irradiated from both ends of the flow channel, offering a higher radiation fluence compare to the one irradiated form one end. Each UV-LED may emit UV radiation of a specific wavelength to provide a combination of different wavelengths irradiating the fluid flow.

Figure 5C:
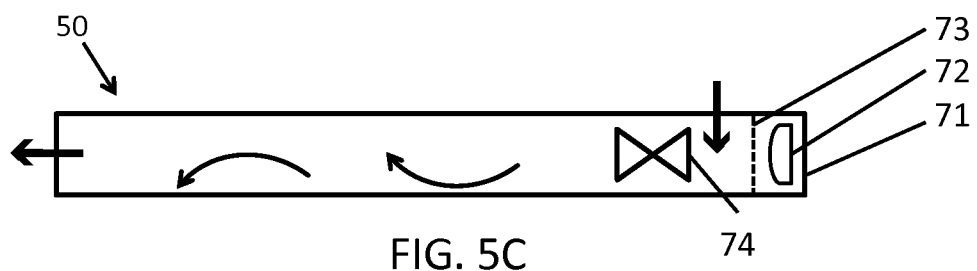

Referring now to FIG. 5C, there is shown the side view of a UV-LED reactor 50 having a housing 71, a UV-LED 72, a UV-transparent window 73, and an element to restrain the fluid flow functioning as a static mixer 74. The curved black arrows indicate mixing of the fluid after passing through the static mixer. The static mixer is applied for the enhancement of mixing and the generation of potential vortices for the improvement of the UV-LED reactor hydrodynamics. Mixing may result in a more uniform distribution of the fluence delivered to the fluid moving in the reactor channels, thereby increasing the reactor performance.

Figure 5D:
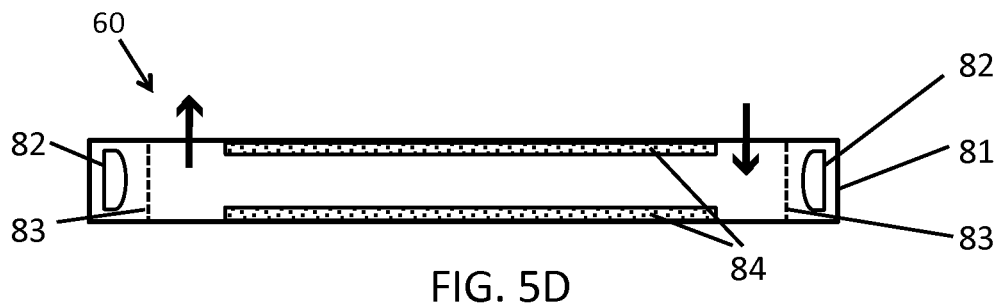

Referring now to FIG. 5D, there is shown the side view of a UV-LED reactor 80 having a housing 81, UV-LEDs 82, UV-transparent windows 83, and photocatalyst immobilized on support structures 84. The photocatalyst is activated by UV radiation from the UV-LEDs to initiate photocatalytic reactions in the UV-LED reactor.

Figure 5E:
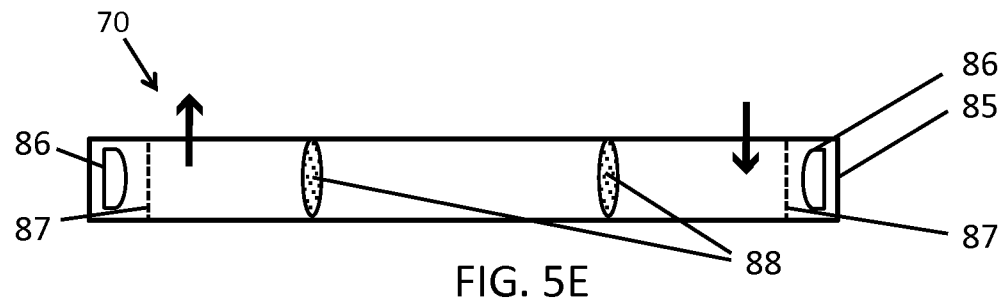

Referring now to FIG. 5E, there is shown the side view of a UV-LED reactor 90 having a housing 85, UV-LEDs 86, UV-transparent windows 87, and photocatalyst immobilized on perforated support structures 88. The photocatalyst is activated by UV radiation from the UV-LEDs to initiate photocatalytic reactions. This configuration, in which the photocatalyst is disposed in the reactor channel cross-section, along with collimated UV radiation focused to irradiate the photocatalyst, may provide high radiation flux to the photocatalyst.

Figure 6A:
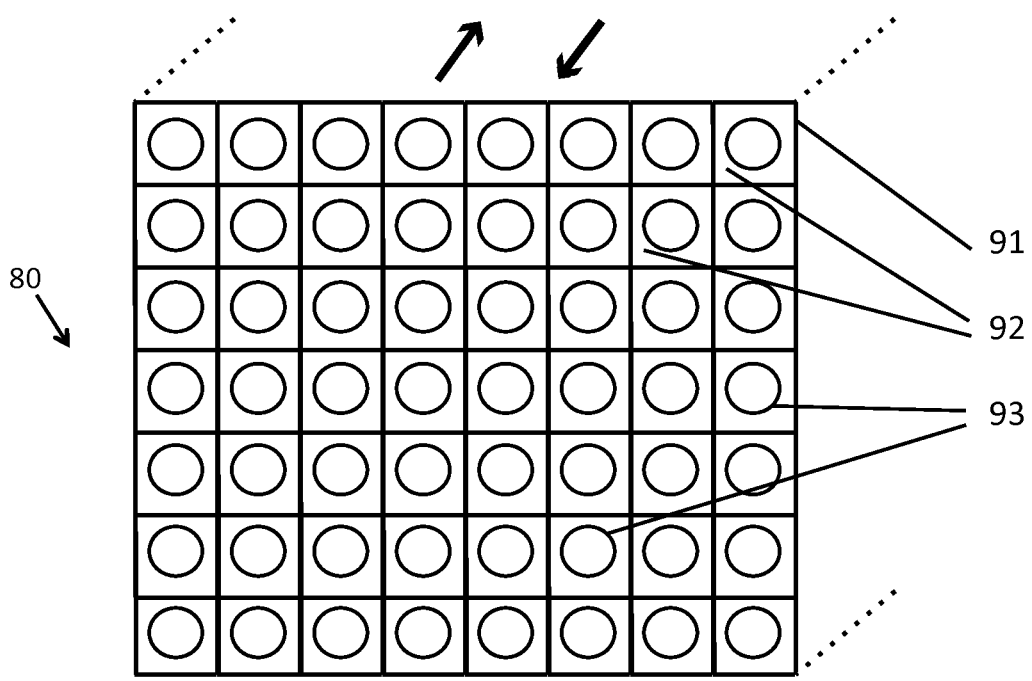
FIG. 6A is a partially-diagrammatic side view of a variation of UV-LED reactor of the present invention.
Figure 6B:
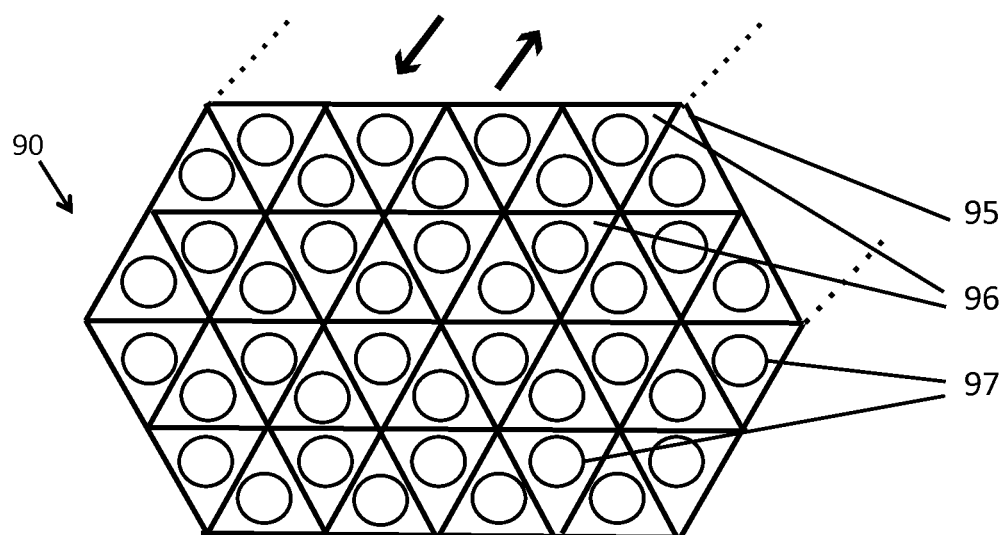
FIG. 6B is a partially-diagrammatic side view of a variation of UV-LED reactor of the present invention.

Referring now to FIGS. 6A and 6B, there are shown the side views (with the dotted lines showing the direction of the third dimension) of two UV-LED reactors 80 and 90, comprising a stack of UV-LED flow channels according to an exemplary embodiment of the present invention. In FIG. 6A there is shown the side view of a UV-LED reactor 80 with rectangular flow channels, having a housing 91, flow channels 92, and UV-LEDs 93 (other components including UV-transparent windows, etc. are not shown for making the figure simple). In FIG. 6B there is shown the side view of a UV-LED reactor 90 with triangular flow channels, having a housing 95, flow channels 96, and UV-LEDs 97 (other components including UV-transparent windows, etc. are not shown to keep the drawing simple). The fluid is irradiated by the LEDs, as it moves through the channels. This configuration makes possible the manufacturing of UV-LED reactors with the potential of delivering high UV fluence (dose) and/or high throughput. The flow channel cross section may be rectangular FIG. 6A, triangular FIG. 6B, or other shapes. The main fluid flow directions are shown by the arrows.

Figure 7A:
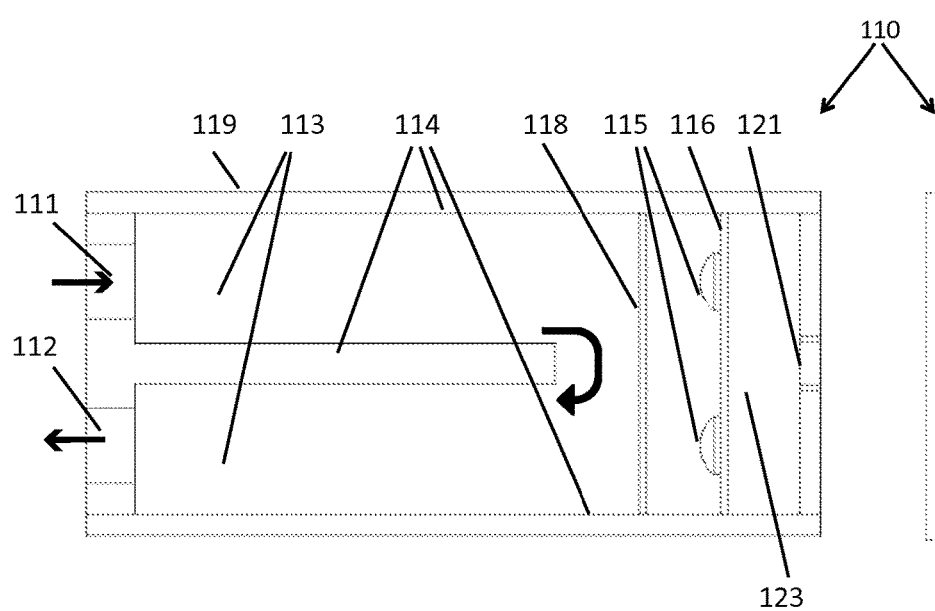
FIG. 7A is a partially-diagrammatic top view of a UV-LED reactor of the present invention.
Figure 7B:
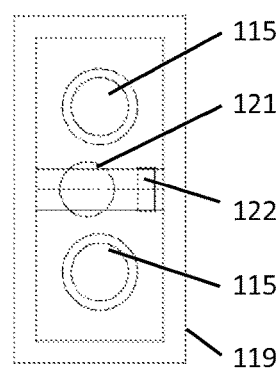
FIG. 7B IS a partially-diagrammatic side view of a UV-LED reactor of the present invention.
Figure 7C:
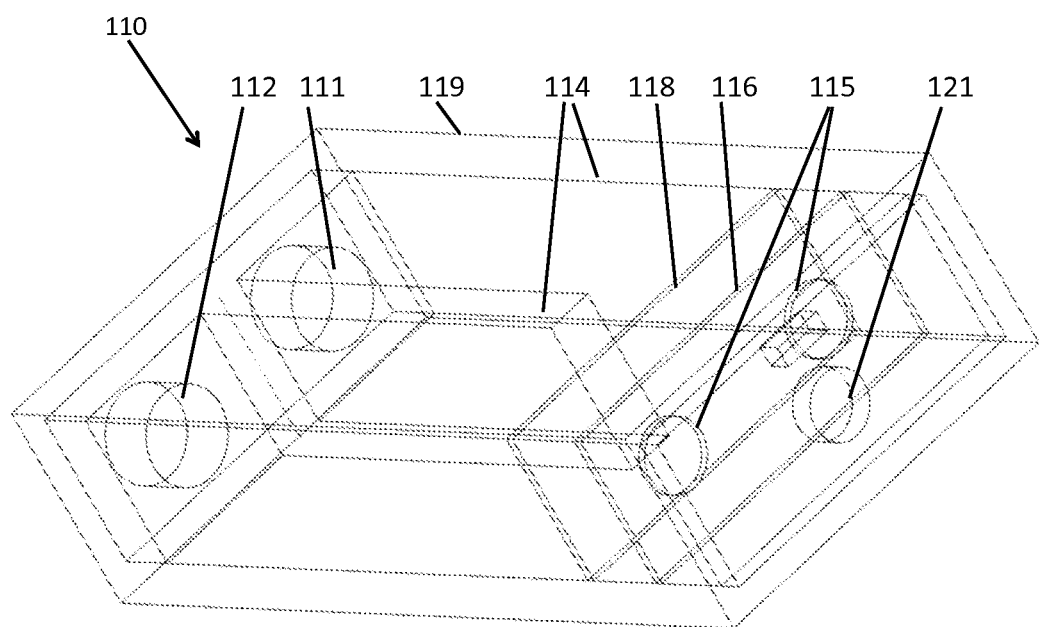
FIG. 7C is a partially-diagrammatic perspective view of a UV-LED reactor of the present invention.

Referring now to FIG. 7A-7C, there are shown a top view (FIG. 7A), a side view (FIG. 7B), and a perspective view (FIG. 7C) of a UV-LED reactor according to an exemplary embodiment of the present invention in more details. There is shown a UV-LED reactor 110, having a housing 119, an inlet port 111 for fluid to enter, an outlet port 112 for fluid to exit, flow channels 113 with channel walls 114, two UV-LEDs 115 mounted on a circuit board 116, a UV-transparent window 118, on/off switch 121, and a power port 122. The drive circuits for UV-LED, microcontrollers, and other electronic mechanisms (none is shown here to keep the drawing simple) may be placed in the electronic housing 123 between the LED circuit board and the on/off switch. Different focusing lenses (not shown), such as a collimating lens may be installed in the reactor in front of the UV-LEDs to focus the UV-LED radiation into the fluid moving in the flow channels. The fluid flows in and out of the UV-LED reactor, passes through the channels, and is irradiated by UV radiation from UV-LEDs.

Figures 8A, 8B:
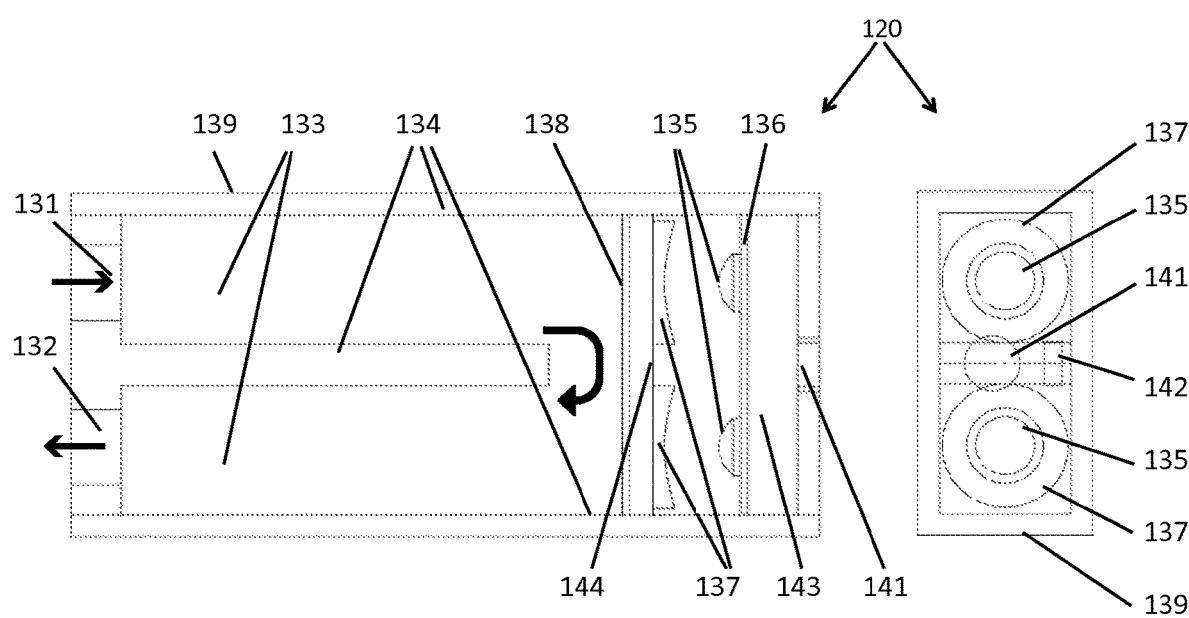
FIG. 8A is a partially-diagrammatic top view of a UV-LED reactor of the present invention.
FIG. 8B IS a partially-diagrammatic side view of a UV-LED reactor of the present invention.
Figure 8C:
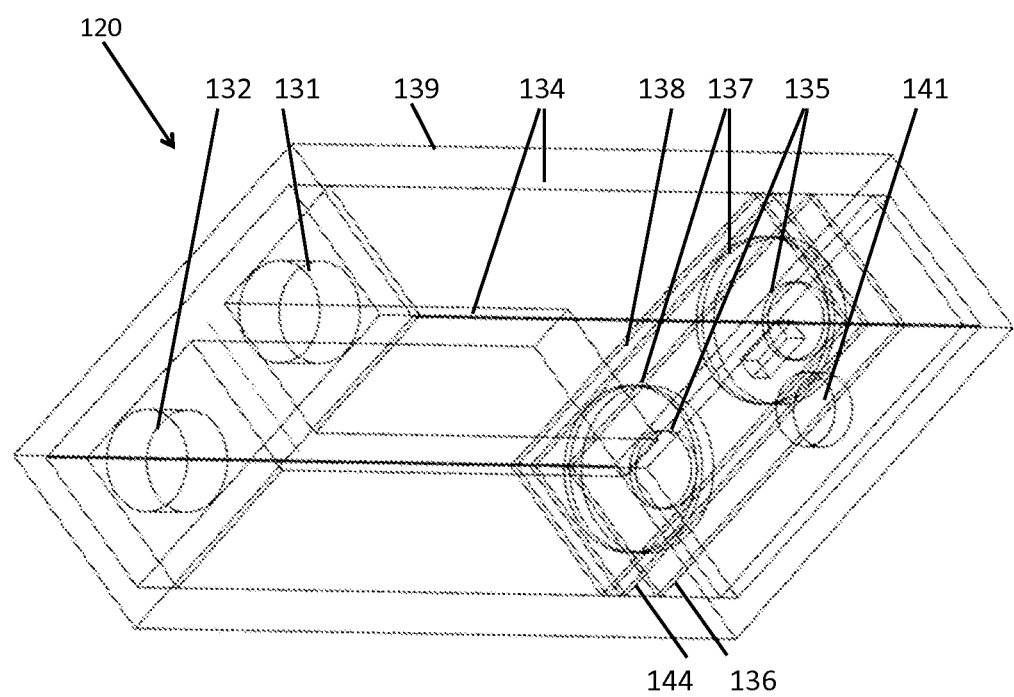
FIG. 8C is a partially-diagrammatic perspective view of a UV-LED reactor of the present invention.
Figure 8D:
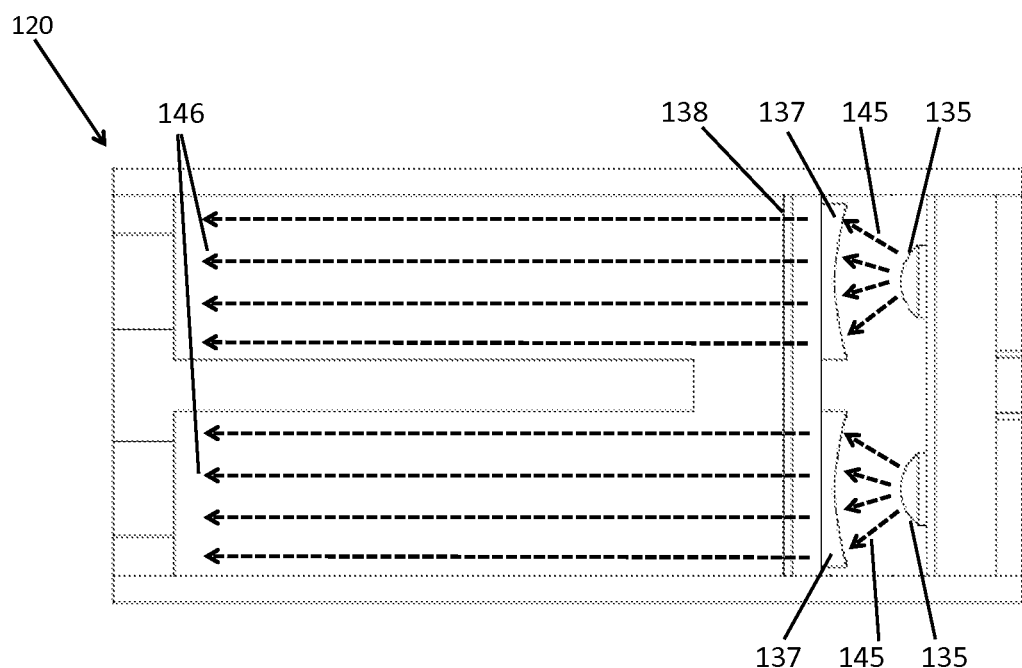
FIG. 8D are partially-diagrammatic top view of a UV-LED reactor of the present invention, showing UV rays.

Referring now to FIG. 8A-8D, there are shown a top view (FIG. 8A and FIG. 8D), a side view (FIG. 8B), and a perspective view (FIG. 8C) of a UV-LED reactor according to an exemplary embodiment of the present invention with more details. There is shown a UV-LED reactor 120, having a housing 139, an inlet port 131 for fluid to enter, an outlet port 132 for fluid to exit, flow channels 133 with channel walls 134, UV-LEDs 135 mounted on a circuit board 136, collimating lenses 137 disposed in front of the UV-LEDs, a frame 144 for holding the collimating lenses in place, a UV-transparent window 138, an on/off switch 141, and a power port 142. The drive circuits for UV-LEDs, microcontrollers, and other electronic mechanisms (none is shown here to keep the drawing simple), may be placed in the electronic housing 143, between the LED circuit board and the on/off switch. The collimating lenses collimate UV radiation from the UV-LEDs into the fluid flow channels. The UV-LED 135 may have a converging lens integrated in the LED. The presence of both a converging lens and a collimating lens in front of a UV-LED may provide a more effective way of irradiating the fluid flow. Referring to FIG. 8D, there are shown UV rays 145 emitted from the UV-LEDs 135 after passing through the collimating lenses 137, are becoming collimated rays 146. The fluid flows in and out of the UV-LED reactor, passes through the channels, and is irradiated by UV collimated rays 146 in the reactor channels. This reactor configuration may have circular cross section of the flow channels, with a diameter similar to that of the collimating lens, so that the UV-LED radiation that is emitted into the fluid flow in the flow channels substantially covers the transversal (or radial) cross-section of the flow channel. The main directions of UV rays are shown by the dashed arrows.

Figure 9A:
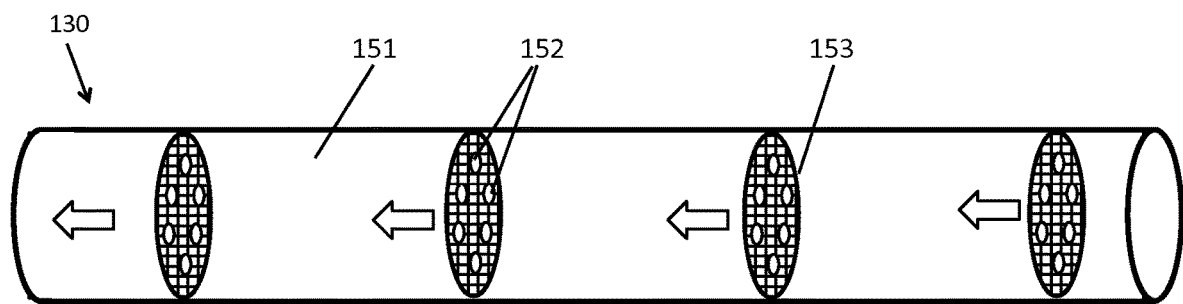
FIG. 9A is a partially-diagrammatic perspective view of a UV-LED reactor of the present invention.
Figure 9B:
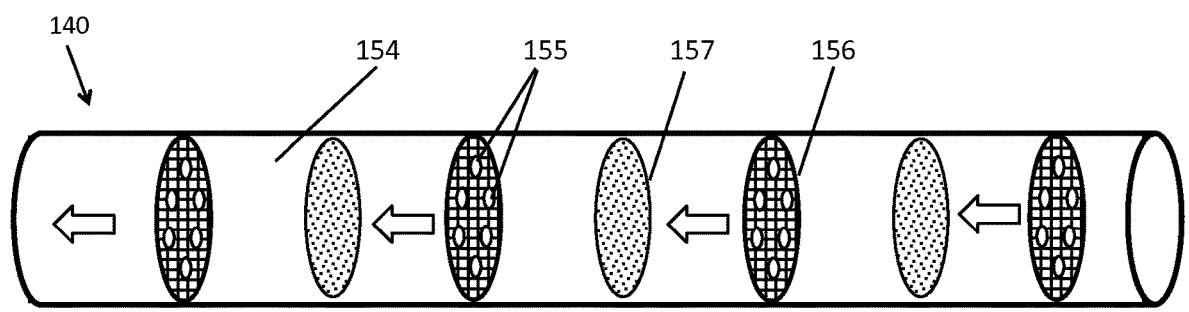
FIG. 9B is a partially-diagrammatic perspective view of a UV-LED reactor of the present invention.

Referring now to FIG. 9A-9B, there are shown partially-diagrammatic perspective views of two configurations for UV-LED reactors, irradiated by UV-LEDs, and disposed through the length of the UV-LED reactor channels. Only the UV-LEDs, UV-LED boards, and photocatalyst structures of the UV-LED reactors are shown in these figures (for simplicity and for a better illustration of the concepts). FIG. 9A illustrates a UV-LED reactor 130, having a series of UV-LEDs 152 mounted on perforated boards 153, wherein the fluid flow (not shown) in the UV-LED reactor channel 151 is irradiated by the UV-LEDs 152. FIG. 9B illustrates a UV-LED reactor 140, having a series of UV-LEDs 155 mounted on a perforated board 156, and a series of photocatalyst structures 157, wherein the fluid flow (not shown) and the photocatalyst structures in the UV-LED reactor channel 154 are irradiated by the UV-LEDs. The fluid flow passes through the LED perforated boards and the photocatalyst structures. This configuration may cause photoreactions and photocatalytic reactions in the fluid. The arrows show the overall direction of the fluid flow as it moves through the UV-LEDs and photocatalyst structures.

Figure 10A:
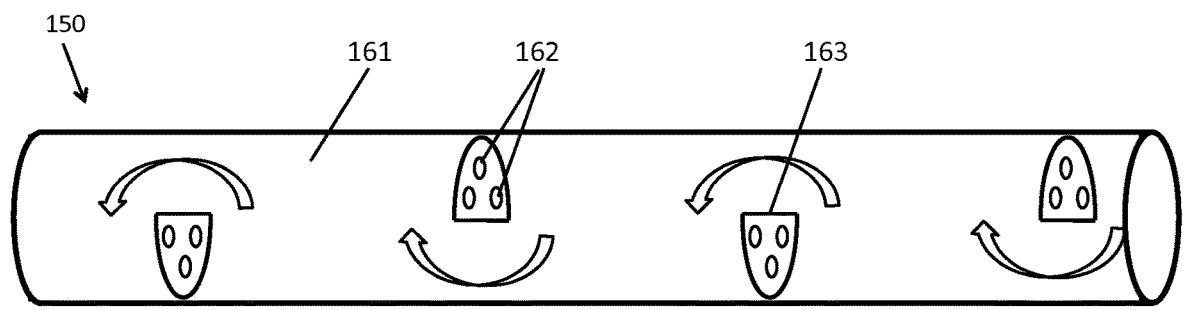
FIG. 10A is a partially-diagrammatic perspective view of a UV-LED reactor of the present invention.
Figure 10B:
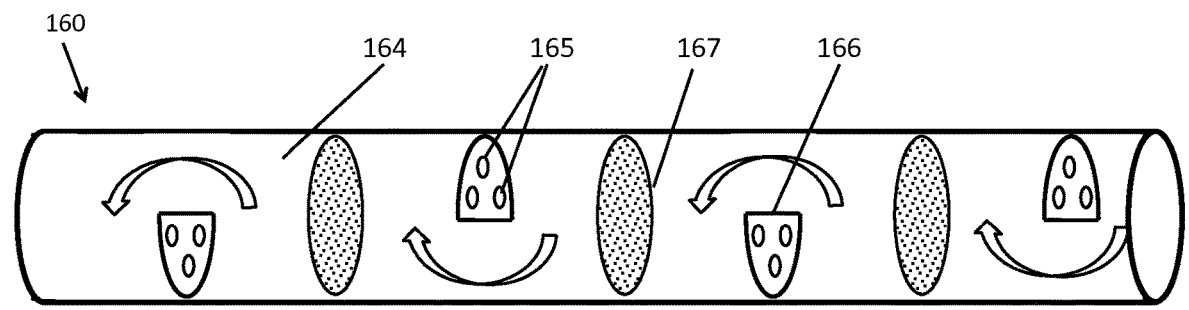
FIG. 10B is a partially-diagrammatic perspective view of a UV-LED reactor of the present invention.

Referring now to FIG. 10A-10B, there are shown partially-diagrammatic perspective views of two configurations for UV-LED reactors, irradiated by UV-LEDs, and disposed throughout the length of the UV-LED reactor channels. Only the UV-LEDs, UV-LED boards, and photocatalysts parts of the UV-LED reactors are shown in these figures (for simplicity and for a better illustration of the concepts). FIG. 10A illustrates a UV-LED reactor 160, which has a series of UV-LEDs 162 mounted on solid boards 163, wherein the fluid flow (not shown) in the UV-LED reactor channel 161 is irradiated by the UV-LEDs 162. FIG. 10B illustrates a UV-LED reactor 170, which has a series of UV-LEDs 165 mounted on a solid board 166, and a series of photocatalyst structures 167, wherein the fluid flow (not shown) and the photocatalyst structures in the UV-LED reactor channel 164 are irradiated by the UV-LEDs. The fluid flow passes (as shown by the curved arrows) on the open side of the LED board (part of the channel that is not occupied by the UV-LED board) and through the photocatalyst structures. This configuration may cause photoreactions and photocatalytic reactions in the fluid. The arrows show the overall direction of the fluid flow mowing through the UV-LEDs and photocatalyst structures.

In the UV-LED reactor configurations presented in FIG. 9 and FIG. 10, the fluid flow and the photocatalyst structures may be irradiated by UV-LEDs from one or both sides; this means that UV-LEDs may be mounted on either side of the LED board. Further, in both configurations presented in FIG. 9 and FIG. 10, static mixers (not shown) may be used to enhance the fluid flow hydrodynamics.

The UV-LED reactors described in FIGS. 1 to 10 may have any shape of the flow channel cross section, such as a circle, a semi-circle, a square, a rectangle, a triangle, a trapezoid, a hexagon, or any suitable shape. These flow cross sections may enhance the reactor performance by improving the reactor hydrodynamics and/or radiation distribution under certain fluid flow conditions and UV-LED radiation pattern. For example the circular cross section channel may provide optimal radiation transfer to the fluid for an UV-LED collimated radiation.

Figure 11:
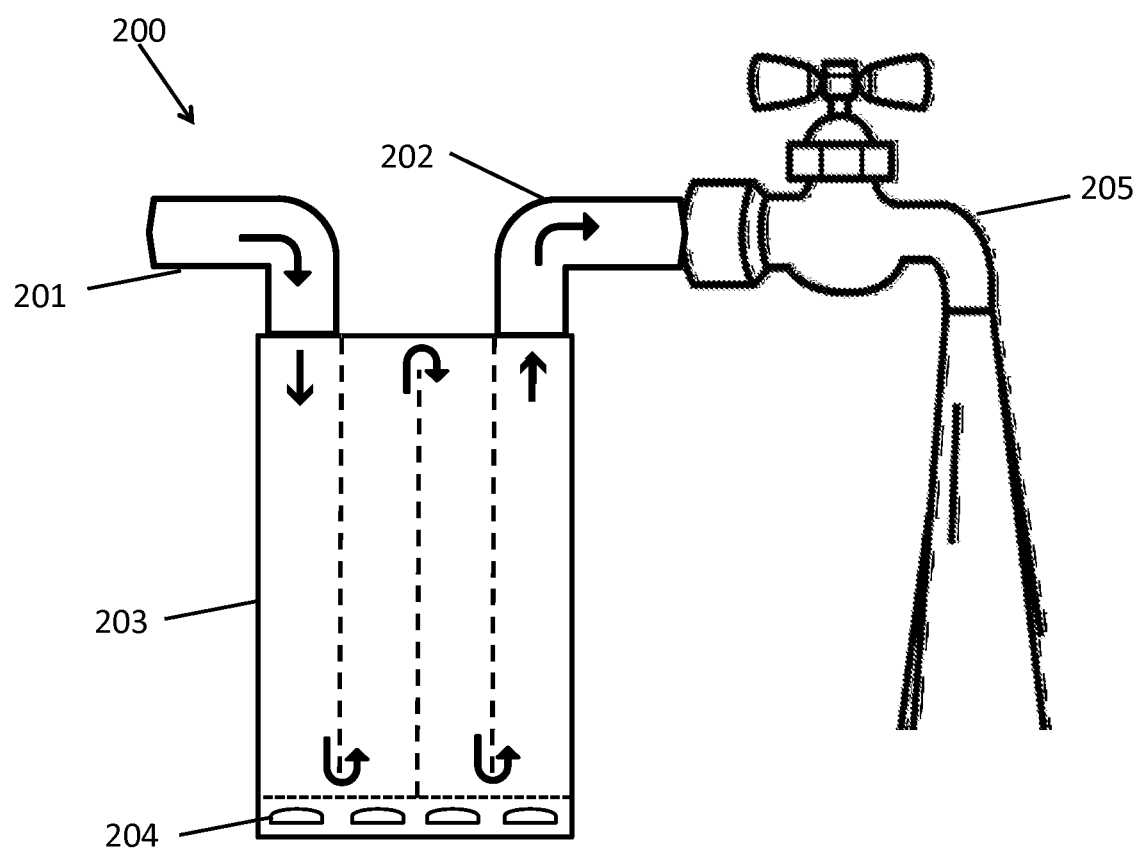
FIG. 11 is a partially-diagrammatic perspective view of a UV-LED reactor applied to water treatment.

Referring now to FIG. 11, there is shown partially-diagrammatic perspective view of a UV-LED reactor applied to water treatment 200, having an inlet pipe 201, an outlet pipe 202, a UV-LED reactor 203, operating with UV-LEDs 204, and a water tap 205. The water enters the reactor from inlet 201, passes through the UV-LED reactor 203, and is irradiated by UV radiation emitted form the UV-LEDs 204 for treatment, prior to exiting from outlet pipe 202 and going to the tap 205 for general use. The general fluid flow directions are shown by the arrows.

Figure 12:
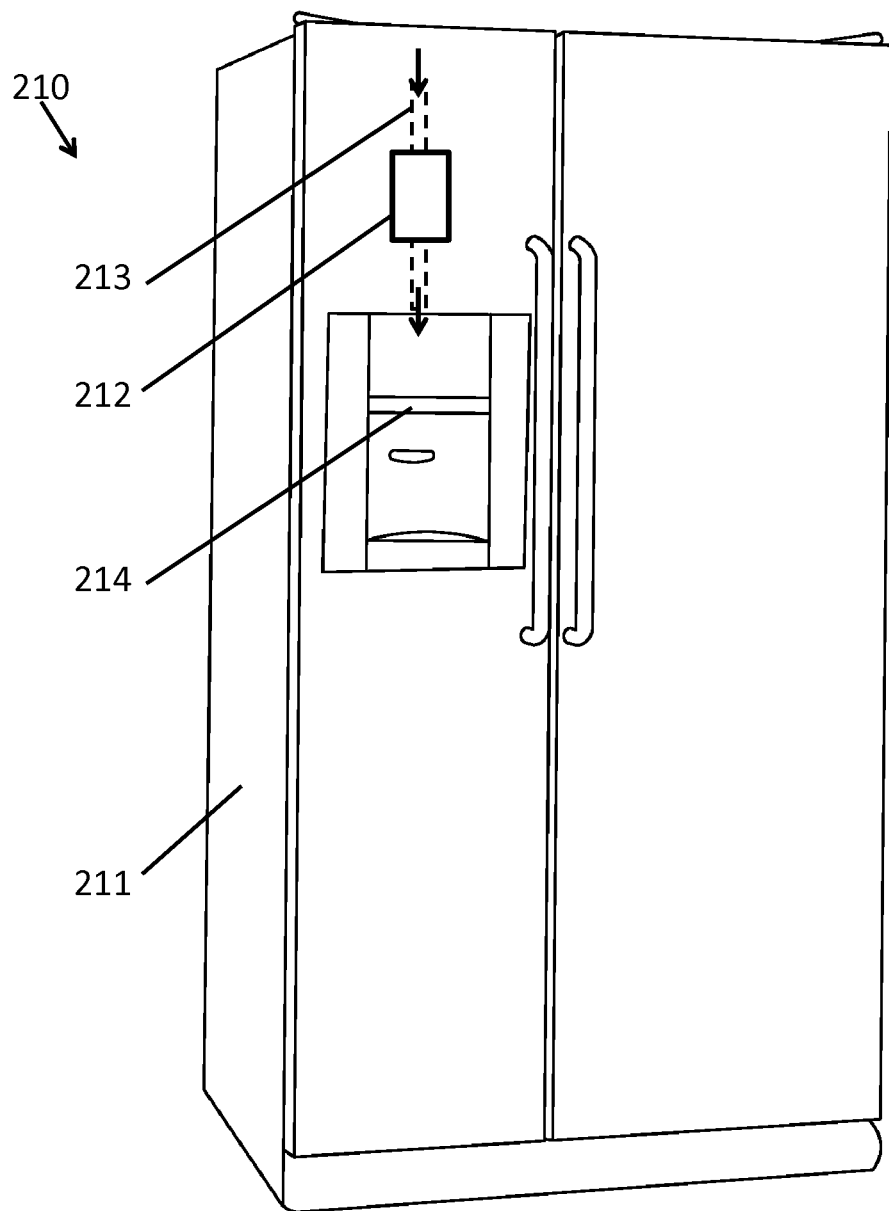
FIG. 12 is a partially-diagrammatic perspective view of a refrigerator containing a UV-LED reactor.

Referring now to FIG. 12, there is shown partially-diagrammatic perspective view of a refrigerator containing a UV-LED reactor 210, having a body 211, a UV-LED reactor 212, a pipe 213, and a water/ice dispenser 214. The water flowing in the pipe 213 passes through the UV-LED reactor 212 for treatment prior to entering the water/ice dispenser 214. The refrigerator is illustrated as an example of appliances. The general fluid flow directions are shown by the arrows.

Figure 13:
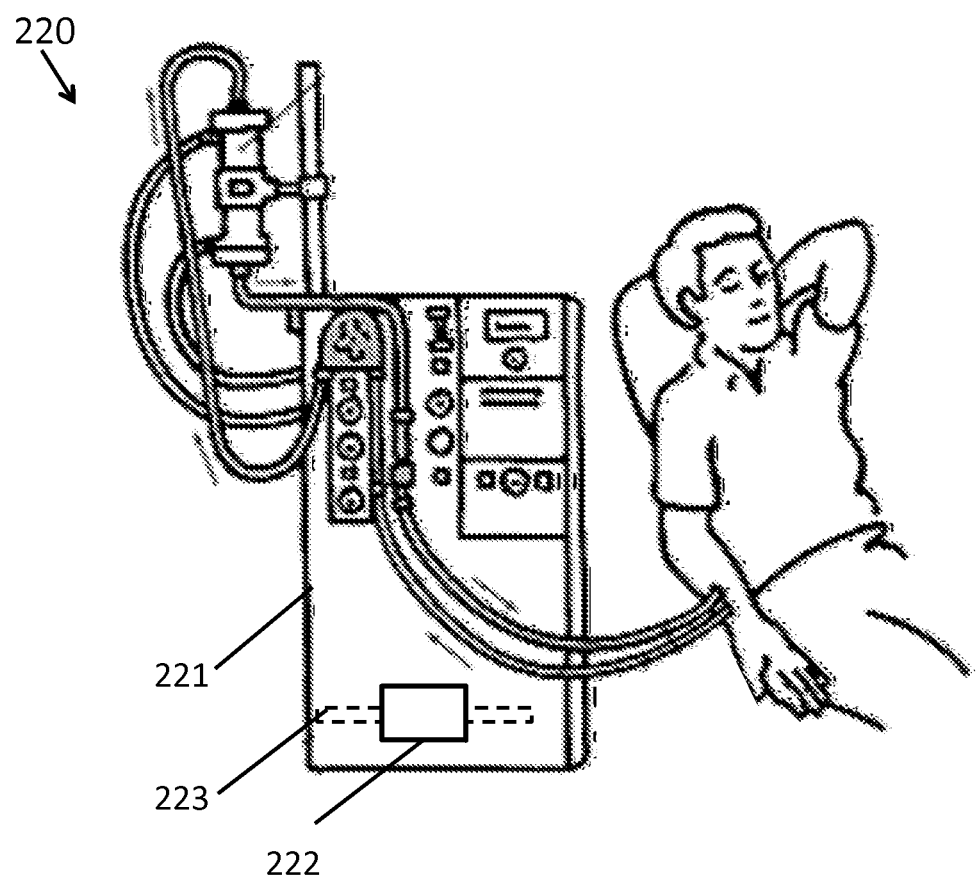
FIG. 13 is a partially-diagrammatic perspective view of a hemodialysis machine containing a UV-LED reactor.

Referring now to FIG. 13, there is shown partially-diagrammatic perspective view of a hemodialysis machine containing a UV-LED reactor 220, having a body 221, a UV-LED reactor 222, and a pipe 223. The water flowing in the pipe 223 passes through the UV-LED reactor 222 for treatment prior to use in the hemodialysis machine. The hemodialysis machine is illustrated as an example of healthcare devices.

The construction details of the invention, as shown in FIG. 2 to FIG. 10, are that the UV-LED reactor housing may be made of aluminum, stainless steel, or of any other sufficiently and strong material, such as metal, alloy, high-strength plastic, or the like. The various components of the UV-LED reactor may also be made of different materials. Further, UV-LEDs of different peak wavelengths may be used to cause synergistic effects to enhance the photoreaction efficiency. Further, a combination of different configuration concepts, which include the concepts presented in FIG. 2 to FIG. 10, may be used. For example, static mixers may be used with photocatalysts.

The advantages of the present invention include, without limitation, that it is an efficient compact UV-LED reactor that can be applied to any UV-activated photoreaction or photocatalytic reaction. One of these applications is water purification by UV-inactivation of microorganisms and UV-based degradation of chemical contaminants. Further, the reactor concept presented in this invention, which can be optimized based on a combination of UV-LED radiation patterns and the flow field hydrodynamics, provides superior UV dose delivery to the fluid. Further, the reactor configurations of the present invention make the design of a small UV reactor with all-integrated components possible. Other advantages of the UV-LED reactor of the present invention include a robust design, lower voltages and power requirements, as well as the ability to turn on/off automatically and with high frequency. These features can result in the application of this UV-LED reactor concept to conditions in which UV-Lamp reactors cannot be used effectively. Further, the UV reactor concept can be applied to both UV photo reactors and photocatalytic reactors for water purification.

Further advantages of the present invention are that it is a simple and efficient water disinfection device suitable for processing low to moderate flow rates of water-ideally suited for point-of-use applications. Further, due to its compact configuration and high efficiency, the UV-LED reactor of the present invention may be incorporated in appliances, particularly refrigerators, freezers, water coolers, coffee machines, or any other kind of water dispenser or icemaker. Further, the UV-LED reactor of the present invention may be incorporated in healthcare facilities or medical devices using water for operation and/or cleaning, such as hemodialysis machines.

In broad embodiment, the present invention is an efficient and compact UV-LED reactor, which is applicable to a range of photoreactions and photocatalytic reactions in a fluid, including a UV-based water treatment.

The present invention is a reactor (photoreactor) operating with one or more ultraviolet light emitting diode [UV-LED] in order to cause photoreactions in a fluid. The UV-LED reactor concepts of the present invention offer precise control of both the fluidic and optical environments. The UV-LED reactor comprises one or a series of specifically designed flow channels and a specially positioned array of UV LEDs. This particular configuration makes the design and fabrication of an efficient and small UV reactor with all-integrated components possible. One or more structures of photocatalyst, activated by UV may also be used in the photoreactor for photocatalytic reactions. Chemical oxidants may also be added to the reactor to react with UV and generate highly active radicals such as hydroxyl radicals for photo-initiated oxidation reactions. The UV-LED reactor may contain baffles or static mixers to alter the hydrodynamics of the flow, thereby enhancing the performance. The UV-LEDs may be turned on and off automatically as the water flows or stop flowing.

In another aspect, the present invention is a UV-LED reactor for water purification in order to inactivate microorganisms (e.g. bacteria and viruses) and/or to degrade micro-pollutants such as chemical contaminants (e.g. toxic organic compounds) by direct photoreaction, and/or photocatalytic reactions, and/or photo-initiated oxidation. The fluid (water) flows through the UV-LED reactor by forced convection preferably using electrical pump(s). The UV-LEDs are preferably powered by wall plug or battery. If applicable, a photocatalyst may be immobilized on a solid substrate where the fluid passes over or on a perforated substrate where the fluid passes through. The photocatalyst may be titanium dioxide $TiO_2$, or other photocatalysts. It may also be any combination of different photocatalysts, catalyst supports, and co-catalysts. If applicable, chemical oxidants may be injected into the reactor. The chemical oxidant may be hydrogen peroxide $H_2O_2$ or ozone $O_3$ or other chemicals.

Also, the present invention is a water purification unit operating with one or more UV-LED (UV-LED reactor) incorporated in appliances, healthcare/medical devices, and dental units (e.g. dental chairs). The UV-LED reactor may be incorporated in water/ice dispenser of refrigerators or freezers for treating the water used for drinking or ice making. Further, the UV-LED reactor may be incorporated in dental units such as dental chair for purifying the water used in dental operation or mouth cleaning. Further, the UV-LED reactor may be incorporated healthcare/medical devices using water for operation and/or cleaning, such as hemodialysis machines.

The present invention is a UV-LED reactor comprises a single or a series of flow channels, which is irradiated with one or an array of UV LEDs. As the flow passes through the flow channels, it is irradiated with UV radiation from LEDs. This conceptual design can be optimized for enhanced hydrodynamics and radiation transfer.

One form of the present invention is a UV-LED reactor having a planar flow channel covered with a quartz window, which is irradiated with an array of UV-LEDs. This concept may have two distinct forms of:
a. The fluid flowing in the channel(s) (including parallel channels) is irradiated by UV-LEDs mainly in a direction that is perpendicular to the axis of the flow channel length (or main flow direction). In this case, the LED(s) are positioned along the length of the flow channel(s). The flow is mainly moving under/over UV-LEDs and is irradiated.
b. The fluid flowing in the channel(s) is irradiated by UV-LEDs mainly in a direction that is parallel to the axis of the flow channel length (or main flow direction). In this case, the LED(s) are positioned at one end or both ends of the flow channel(s). The flow is mainly moving towards or away from UV-LEDs and is irradiated.

In both reactor concepts, the exposure of fluid to UV radiation can be easily controlled. The flow channels and UV-LED arrays can be arranged in a way that the flow gets exposed to the desired number of LEDs. The design may be a single flow channel, a series of parallel flow channels, or a stack of multiple flow channels. The total UV dose delivered to a fluid may be controlled by adjusting the flow rate and/or regulating UV-LED power, and/or turning on/off the number of UV-LEDs. This design makes the manufacturing of thin planar UV reactors possible (the actual design could be similar to that of a smart phone or the like, in terms of geometry and dimensions, with inlet and outlet ports for a fluid).

In one variation of the present invention UV-LEDs are integrated into a rigid or flexible pipeline, where water flows. This would be of particular interest where the fluid has to be irradiated/treated while passing through a pipe, or where there is a need to prevent the formation of potential microorganism biofilm inside a pipe, or where the flow needs to be treated at the end of a pipeline before being used.

In another variation of the present invention one or more photocatalysts, such as $TiO_2$ may be used in the UV-LED photoreactor to be activated by UV to form oxidative hydroxyl radicals and other active radicals. This will result in photo-initiated oxidation reactions. The photocatalysts immobilized on different supports (solid or perforated) may be positioned in the flow channels.

In another variation of the present invention static mixers, vortex generators, and baffles may be used in the flow channels to increase mixing and/or rotate the flow as it goes through the flow channels. This can result in enhancing UV-LED reactor performance by delivering more uniform UV dose or enhancing mass transfer near the photocatalyst surface.

In another variation of the present invention, the LEDs may be programmed to turn on and off automatically, for example as the flow passes or stops in the reactor, and/or at specific time intervals. For controlling UV-LEDs a sensor may be used to detect the fluid motion or the like, or to be activated by a signal from another operation (e.g. by turning the valve on/off). In another variation of the present invention, the LEDs may be programmed to adjust their power output, or change the number of LEDs on/off, for example as the flow rate or the quality of the fluid passing through UV-LED reactor is changing. In another variation of the present invention the LEDs are operating in a pulsed mode (likely at high frequencies). This can potentially affect the photocatalyst's electron-hole recombination and hence increase photocatalytic efficiencies.

In another variation of the present invention, the fluid flowing through the channels may be used for transferring the heat generated by the LEDs. This may be achieved either by the fluid flowing on one side of the LED board or by using highly thermal conductive material as the LED board connected to the flow channels made of thermal conductive material.

While the UV-LED reactor concept of the present invention may be used for any photoreactions, photocatalytic reactions, and photo-initiated reactions, one of the main applications is water (or other UV-transparent fluids) purification.

The present invention is the application of UV-LED reactors for point of use fluid treatment in the following devices:
1. UV-LED reactor incorporated in appliances, particularly refrigerators, freezers, water coolers, coffee machines, or any other kind of water dispensers or icemakers.
2. UV-LED reactor incorporated in dental units, particularly dental chairs, mobile dental carts, and mobile dental clinics for dental work.
3. UV-LED reactor incorporated in healthcare facilities or medical devices using water for operation and/or cleaning, in particular hemodialysis machines.

In all the above cases, the UV-LED reactor may be either incorporated into the device or be applied as an add-on into the existing device (for example somewhere through the waterline).

UV-LED reactor incorporated in appliances including refrigerator, freezer, water cooler and other forms of water/fluid dispensers.

The invention is a UV reactor operating with UV-LEDs that is incorporated in appliances that dispense or use water for consumption. The UV-LED reactor treats the water that is used in (e.g. passing through the waterlines of) refrigerators, freezers, water coolers, coffee makers, wending machines, and the like. The water may be pure water or water-based fluids such as coffee. The UV-LEDs of the reactor may be turned on and off automatically as the water flows or stop flowing.

The present invention of a UV-LED reactor that is incorporated in water coolers and refrigerators is an effective mechanism to reduce the microbial contamination in the water leaving the waterline (for consumption) and reduce the risk for infection. This is possible because of the special operating conditions of UV-LEDs. UV-LED reactor can operate at a range of temperature and can be turned on and off with high frequency, which is particularly important for refrigerator and water cooler application.

In another aspect, the present invention is a refrigerator and/or freezer water dispenser unit (including water/ice dispenser) comprising a UV-LED device (reactor) for water purification.

In another aspect, the present invention is a water cooler comprising a UV-LED device (reactor) for water purification.

In another aspect, the present invention is a coffee machine comprising a UV-LED device (reactor) for water purification.

The water used for human consumption needs a high degree of purification. The main water supply for refrigerator, freezer, and water cooler may contain harmful pathogens. This is of particular concern in developing countries and remote areas where water may not be treated properly before distribution in the water network. In addition, the particular structure of refrigerator/freezer waterline favors the presence of biofilm and microbial contamination. Polymeric tubing typically transfers water from the main water supply to refrigerators to be used in through-the-door ice and drinking water. Bacterial biofilm can form in the waterline, in particular when the water is not in use (biofilm can form within 8 hours). Intermittent use patterns of water lead to stagnation of the entire water column within the waterlines for extended periods during the day. The ability of bacteria to colonize surfaces and to form biofilm in water supply tubes is a common phenomenon, which has been well recognized.

UV-LED reactor incorporated in dental units.

The invention is a UV reactor operating with UV-LEDs that is incorporated in a dental unit to treat the water used in the unit. UV-LED reactor may be integrated in the dental units (such as a dental chairs) or the UV-LED reactor may be placed within the tray of the dental chair (assistant tray) holding the water spry, or within the water spray handle, or somewhere else through the waterline, for the treatment of the water prior to use. Features including instant on and off may be included in the UV-LED reactor integrated in a dental unit.

In another aspect, the present invention is a dental unit comprising a UV-LED device (reactor) for water purification.

Surveys of dental unit waterlines (DUWLs) indicate that biofilm formation is a universal problem and great majority of bacteria that have been identified from DUWL are ubiquitous, although present in only low numbers in domestic water distribution systems, but can flourish as biofilms on the lumen surfaces of narrow-bore waterlines in dental units [Liaqat, and Sabri, 2011: Biofilm, dental unit water line and its control, J. Cln. Exper. Microbiol 12, 1, 15-21]. Microorganisms from contaminated DUWL are transmitted with aerosol and splatter, generated by working unit hand-pieces. Various studies emphasize the need for reducing the microbial contamination in DUWL [Szymanska et. al., 2008: Microbial contamination of dental unit waterlines, Annals of agricultural and environmental Volume 15, 2, 173-17].

UV-LED reactor incorporated in healthcare/medical devices such as hemodialysis machine and colon hydrotherapy machine.

The invention is a UV reactor operating with UV-LEDs that is incorporated in a healthcare device to treat the water used in or by the device. Further, the invention is a UV reactor operating with UV-LEDs that is incorporated in hemodialysis devices (hemodialysis machine) to treat the water used in these devices. Further, the invention is a UV reactor operating with UV-LEDs that is incorporated in a colon hydrotherapy equipment to treat the water used in the equipment. UV-LED reactor may be integrated in these devices/equipment along with other forms of water purification methods such as filtration.

In another aspect, the present invention is a hemodialysis device comprising a UV-LED device (reactor) for water purification.

Many healthcare applications require water quality to be of a higher standard than drinking water. The efficient, compact design nature of UV-LED reactors makes them more attractive than conventional UV for implementing in healthcare devices.

Figure 14A:
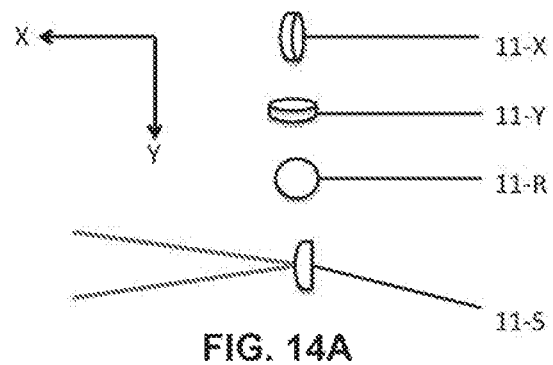
FIGS. 14A-F are UV-LED perspective views (11-X & 11-Y), rear view (11-R), and side view (11-S), and various lenses emitting radiation with relatively small angle (FIG. 14A), large angle (FIG. 14B), collimated radiant (FIG. 14C), diverged radiant (FIG. 14D), converged radiant (FIG. 14E), and collimated radiant in detail (FIG. 14F).
Figure 14B:
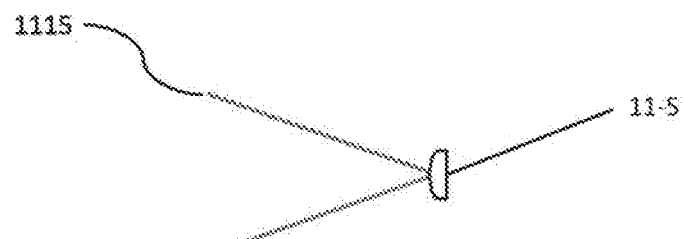
Figure 14C:
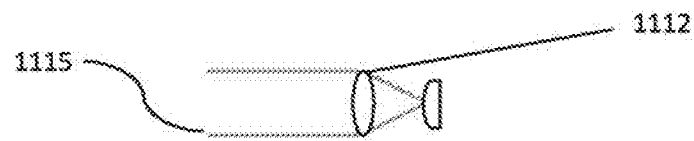
Figure 14D:
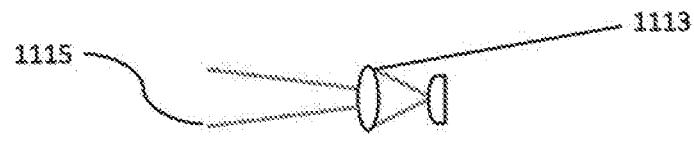
Figure 14E:
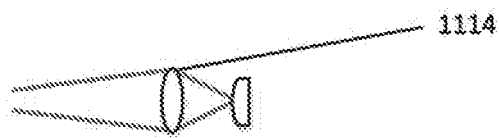
Figure 14F:
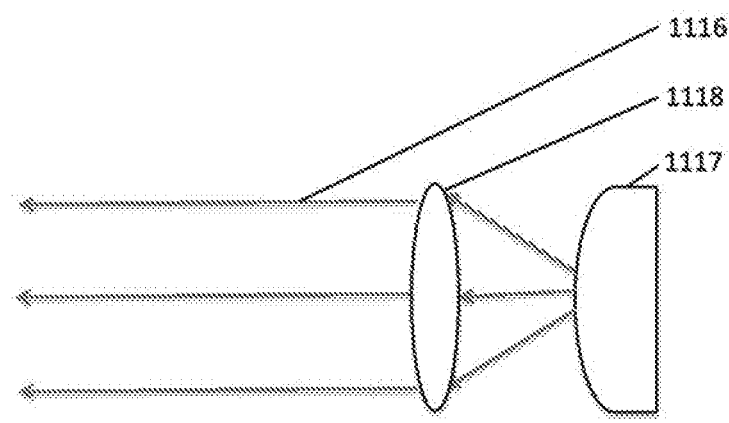

Referring to FIGS. 14A-F, there is shown LED perspective views emitting radiation in X-direction 11-X, and Y-direction 11-Y (the XY axes are shown on the figure), LED rear view 11-R (back of LED, where radiation is emitted in the direction parallel, and opposite to that of a vector normal to the face of the page showing LED), and side-view 11-S (side of LED, where radiation is emitted in the direction perpendicular to that of a vector normal to the face of the page showing LED). There is also shown collimating lens 1112, diverging lens 1113, and converging lens 1114, as well as the schematic outmost of radiation fluxes 1115. The LEDs may emit radiation with different angles (often refer to as LED view angle) such as relatively small (narrow) angle or large (wide) angle shown in FIGS. 14A and 14B, respectively. The LED radiation may also be collimated, diverged, or converged as shown in FIG. 14C, FIG. 14D, and FIG. 14E, respectively. As an example, there is shown in FIG. 14F the radiant beams 1116 emitted from an LED 1117 after passing through a collimated lens 1118. In FIG. 14F the arrows show the main direction of the radiation. In the following figures, FIG. 14A to FIG. 25B, the top-view, bottom-view, and side-view of LEDs are shown in a similar way that is shown here in FIGS. 14A-F. For the inventions described in following figures, FIG. 14A to FIG. 25B, the LEDs may emit radiation in different angles and their radiation pattern may be modified by applying appropriate lenses. In the following figures, FIG. 14A to FIG. 25B, the LEDs in all the drawings both hidden and visible are drawn with solid lines (instead of typical dashed lines for hidden), for better clarity. Also, in some of the following figures, FIG. 14A to FIG. 25B, other main components such as photocatalyst structures and mixers in the drawings both hidden and visible are drawn with solid lines (instead of typical dashed lines for hidden), for better clarity.

Figure 15:
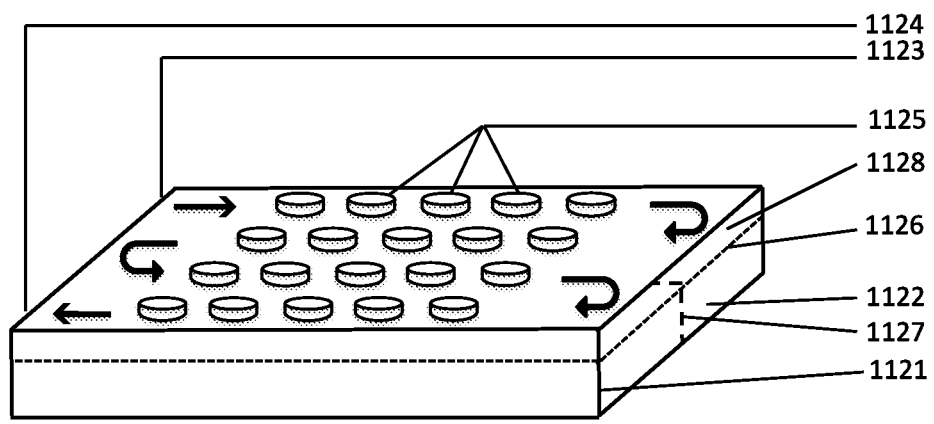
FIG. 15 is a perspective view of a UV-LED reactor, where the LED (s) are positioned along the length of the flow channel(s), of the present invention.
Figure 16A:
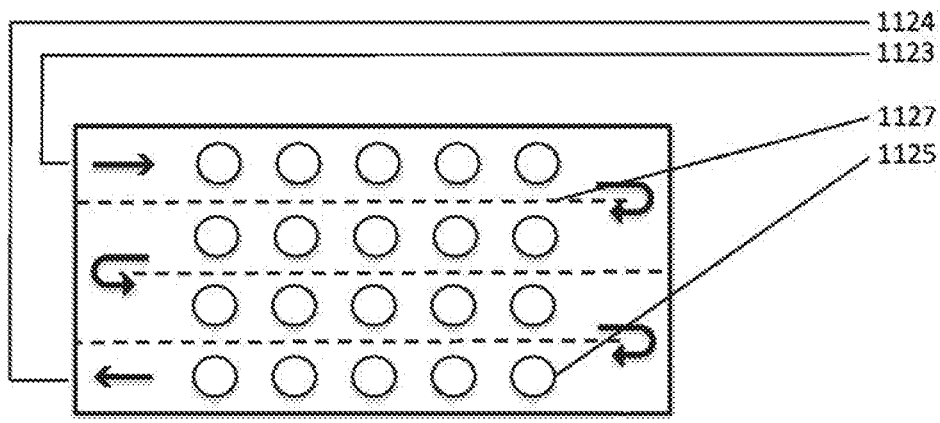
FIG. 16A is a top view and FIGS. 16B and 16C are side views of a UV-LED reactor, where the LED(s) are positioned along the length of the flow channel(s), of the present invention.
Figure 16B:
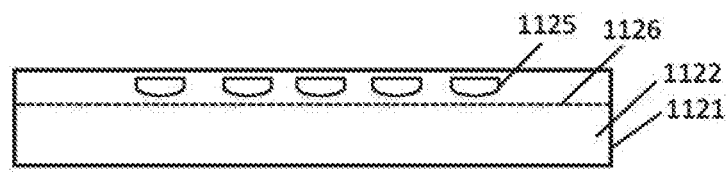
Figure 16C:
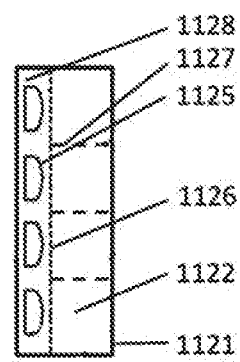

Referring now to the invention in FIG. 15 (perspective view) and FIGS. 16A-C (top view FIG. 16A, side views FIGS. 16B and 16C), there is shown a UV-LED reactor having a rigid body 1121, flow channels 1122 with channel walls 1127, an inlet for fluid (e.g. water) to flow in 1123 and an outlet for fluid to flow out 1124, one or more LEDs 1125 placed in LED housing 1128, and a UV-transparent quartz window 1126. The LEDs may be mounted on a circuit board (not shown to keep the drawing simple). There may also be one or more heat sink, drive circuits for UV-LED and other components, microcontrollers and other electronic mechanisms, a power port, and an on/off key (non is shown here to keep the drawings simple). Different lenses including the collimating, diverging, converging, and other lenses may be installed in the device to adjust the UV-LED radiation pattern (not shown to keep the drawings simple). Two adjacent flow channels may be connected at one end, for the fluid to go from one channel to another channel (fluid experiences multi-pass through the rector). The main fluid flow directions (for multi-pass flow) are shown by the arrows.

Still referring to the invention in FIG. 15 and FIGS. 16A-C in more detail, the fluid flows in and out of the device and passes through the channels and is irradiated by UV radiation from UV-LEDs. The LED(s) are positioned along the length of the flow channel(s). The main direction of the radiation is perpendicular to the main direction of the flow. The flow is mainly moving under (or over) UV-LEDs and is irradiated. The internal wall of the channels may be made of or be coated with material with high UV reflectivity for better radiation transfer to the fluid.

Figure 17:
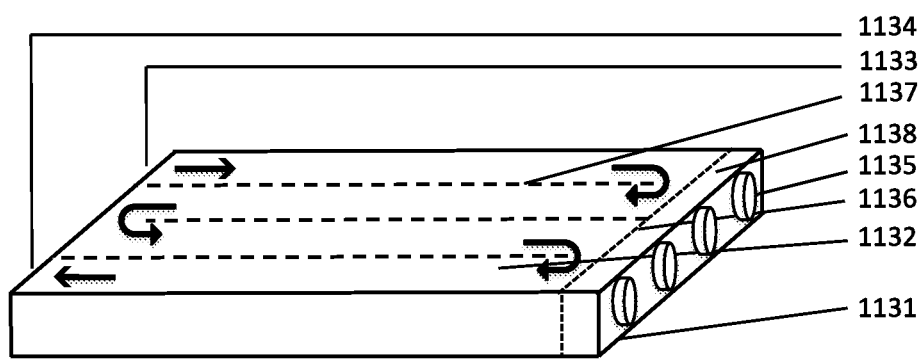
FIG. 17 is a perspective view of a UV-LED reactor, where the LED (s) are positioned at one end of the flow channel(s), of the present invention.
Figure 18A:
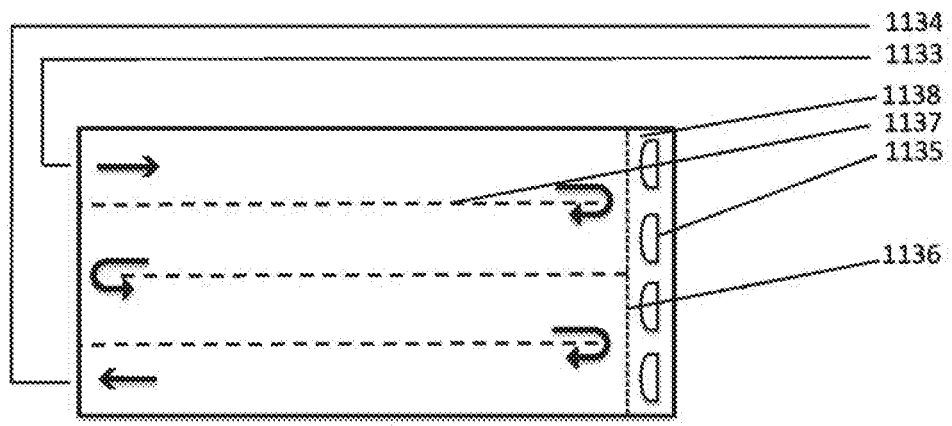
FIG. 18A is a top view and FIGS. 18B and 18C are side views of a UV-LED reactor, where the LED(s) are positioned at one end of the flow channel(s), of the present invention.
Figure 18B:
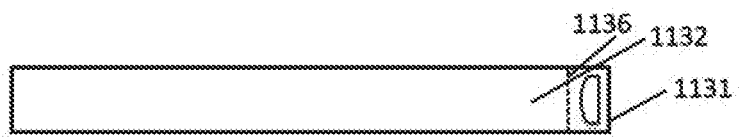
Figure 18C:
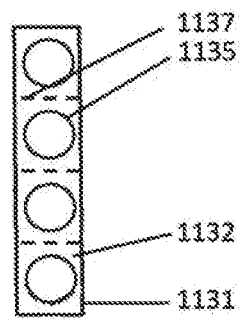

Referring now to the invention in FIG. 17 (perspective view) and FIGS. 18A-C (top view FIG. 18A, side views FIGS. 18B and 18C there is shown a UV-LED reactor having a rigid body 1131, flow channels 1132 with channel walls 1137, an inlet for fluid (e.g. water) to flow in 1133 and an outlet for fluid to flow out 1134, one or more LEDs 1135 placed in LED housing 1138, and a UV-transparent quartz window 1136. The LEDs may be mounted on a circuit board (not shown to keep the drawing simple). There may also be one or more heat sink, drive circuits for UV-LED and other components, microcontrollers and other electronic mechanisms, a power port, and an on/off key (non is shown here to keep the drawing simple). Different lenses including the collimating, diverging, converging, and other lenses may be installed in the device to adjust the UV-LED radiation pattern. Two adjacent flow channels may be connected at one end, for the fluid to go from one channel to another channel (fluid experiences multi-pass through the rector). The main fluid flow directions (for multi-pass flow) are shown by the arrows.

Still referring to the invention in FIG. 17 and FIGS. 18A-C in more detail, the fluid flows in and out of the device and passes through the channels and is irradiated by UV radiation from UV-LEDs. The LED(s) are positioned at one end (or both ends) of the flow channel(s). The main direction of the radiation is parallel to the main direction of the flow. The flow is mainly moving towards or away from UV-LEDs and is irradiated. The internal wall of the channels can be made of or be coated with material with high UV reflectivity for better radiation transfer to the fluid. Using collimator lens may particularly be advantageous for this design, to keep the radiation intensity relatively high as it travels from one to the other end of the flow channel.

Figure 19A:
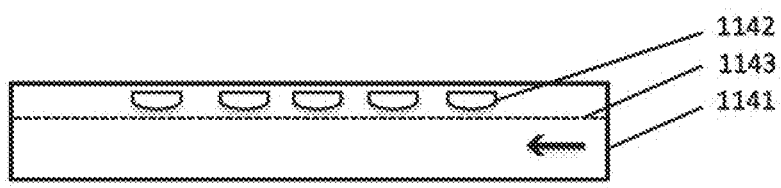
FIGS. 19A and 19B are side views of UV-LED reactors, where the LED(s) are positioned along the length of the flow channel(s), on one side (top) (FIG. 19A) or both sides (top & bottom) (FIG. 19B), of the present invention.
Figure 19B:
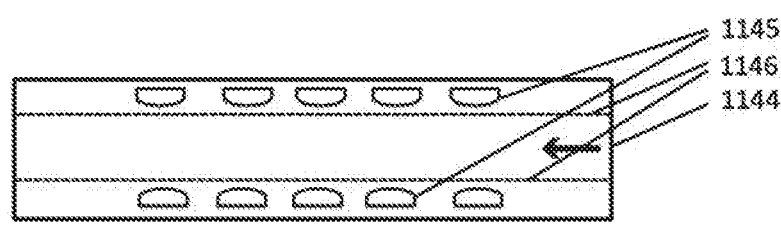

Referring now to the invention in FIG. 19A, there is shown the side view a UV-LED reactor with the design concept similar to the one described in FIG. 15 and FIGS. 16A-C, having a rigid body 1141, UV-LEDs 1142, and quartz windows 1143, where the flow is irradiated from one side of the channel by LEDs, as it flows in the channel. Referring now to the invention in FIG. 19B, there is shown the side view a UV-LED reactor with the design concept similar to the one described in FIG. 15 and FIGS. 16A-C, having a rigid body 1144, UV-LEDs 1145, and quartz windows 1146, where the flow is irradiated from two sides of the channel by LEDs, as it flows in the channel. The main direction of the radiation is perpendicular to the main direction of the flow. The main fluid flow directions are shown by the arrows.

Figure 20A:
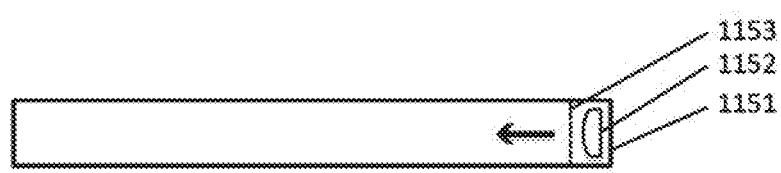
FIGS. 20A and 20B are side views of UV-LED reactors, where the LED(s) are positioned at the ends of the flow channel(s), on one end (right) (FIG. 20A) or both ends (right & left) (FIG. 20B)
Figure 20B:
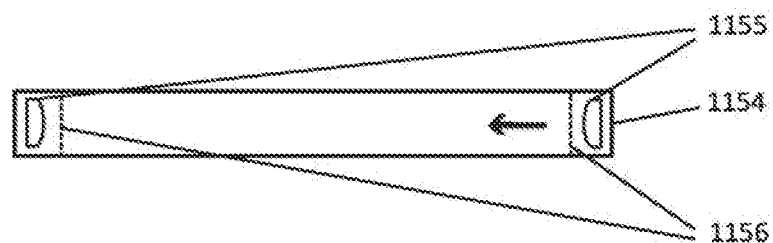

Referring now to the invention in FIG. 20A, there is shown the side view a UV-LED reactor with the design concept similar to the one described in FIG. 17 and FIGS. 18A-C, having a rigid body 1151, UV-LEDs 1152, and quartz windows 1153, where the flow is irradiated from one side of the channel by LEDs, as it flows in the channel. Referring now to the invention in FIG. 20B, there is shown the side view a UV-LED reactor with the design concept similar to the one described in FIG. 17 and FIGS. 18A-C, having a rigid body 1154, UV-LEDs 1155, and quartz windows 1156, where the flow is irradiated from two sides of the channel by LEDs, as it flows in the channel. The main direction of the radiation is perpendicular to the main direction of the flow. The main fluid flow directions are shown by the arrows.

Figure 20C:
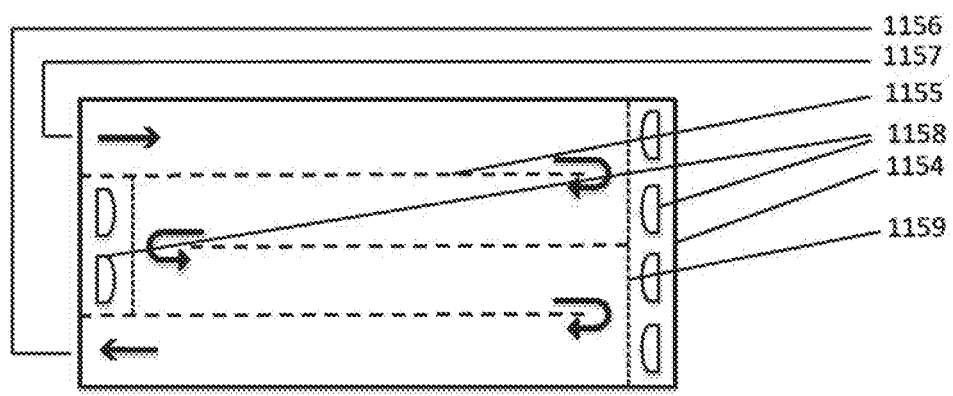
FIG. 20C is the top view of a 4-channel UV-LED reactor with the LEDs on both ends in two flow channels of the present invention.
Figure 21A:
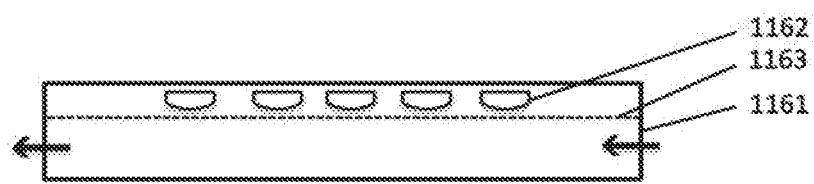
FIGS. 21A-E are side views of several single channel UV-LED reactor configurations of the present invention, where the LED (s) are positioned along the length of the flow channel (FIG. 21A), a UV-LED reactor with a static mixer (FIG. 21B), a UV-LED reactor with a photocatalyst structure at the bottom of the flow channel (FIG. 21C), a UV-LED reactor with a photocatalyst structure at the middle of the flow channel (FIG. 21D), a UV-LED reactor with photocatalyst on perforated structures (FIG. 21E)
Figure 21B:
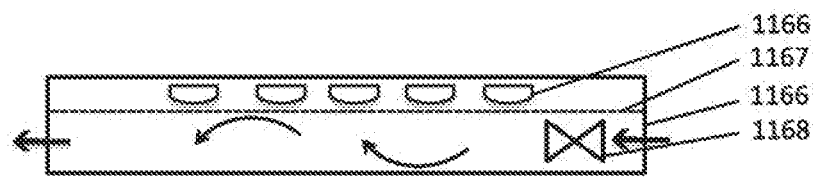
Figure 21C:
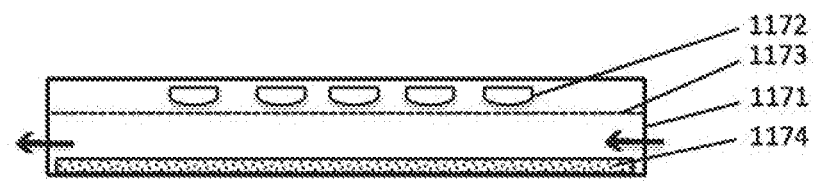
Figure 21D:
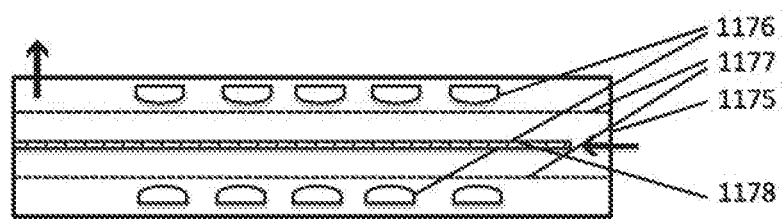
Figure 21E:
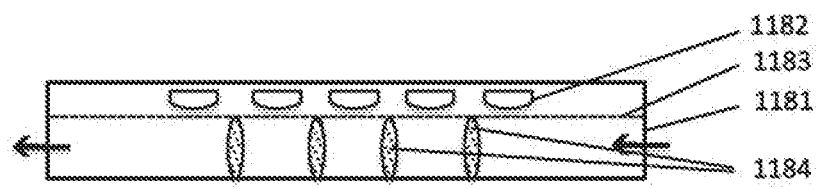

Referring now to the invention in FIG. 20C, there is shown the top view of a UV-LED reactor with the concept similar (but not identical) to the one described in FIG. 17 and FIGS. 18A-C, having a rigid body 1154, flow channel walls 1155, an inlet for fluid (e.g. water) to flow in 1156 and an outlet for fluid to flow out 1157, one or more LEDs 1158 and a UV-transparent quartz window 1159. This is a multi-channel reactor where the flow is irradiated by LEDs in some of the channels from one side (the two channels on the sides) and in some of the channels from two sides (the two channels in the middle), as it flows in the channel. The main direction of the radiation is parallel to the main direction of the flow. The main fluid flow directions are shown by the arrows.

Referring now to the invention in FIGS. 21A-E, there is shown the side views of several single channel UV-LED reactor configurations, with the similar concept to the one described in FIG. 15 and FIGS. 16A-C, some having a static mixer (or vortex generator) or photocatalyst structures. These configurations are applicable to multi-channel UV-LED reactors as well (the inlet/outlet directions may be different). The straight black arrows indicate the main direction of the flow, as well as the main direction of inlet flow and outlet flow of the reactors. Referring to the invention in FIG. 21A, there is shown the side views of a UV-LED reactor having a rigid body 1161, UV-LEDs 1162, and quartz windows 1163. Referring to the invention in FIG. 21B, there is shown the side views of a UV-LED reactor having a rigid body 1164, UV-LEDs 1165, quartz windows 1166, and static mixer 1167. The curved black arrows indicate mixing of the fluid after passing through the static mixer. The mixer is applied for the enhancement of mixing and the generation of potential vortices for the improvement of the UV-LED reactor hydrodynamics. Referring to the invention in FIG. 21C, there is shown the side views of a UV-LED reactor having a rigid body 1171, UV-LEDs 1172, quartz windows 1173, and photocatalyst immobilized on a support structure 1174. Referring to the invention in FIG. 21D, there is shown the side views of a UV-LED reactor having a rigid body 1175, UV-LEDs 1176, quartz windows 1177, and photocatalyst immobilized on a perforated support structure 1178. Referring to the invention in FIG. 21E, there is shown the side views of a UV-LED reactor having a rigid body 1181, UV-LEDs 1182, quartz windows 1183, and photocatalyst immobilized on a perforated support structure 1184. The photocatalyst is activated by UV radiation from UV-LEDs to initiate photocatalytic reactions such as photo-initiated oxidation.

Referring now to the invention in FIGS. 22A-E, there is shown the side views of several single channel UV-LED reactor configurations, with the similar concept to the one described in FIG. 17 and FIGS. 18A-C, some having a static mixer (or vortex generator) or photocatalyst structures. These configurations are applicable to multi-channel UV-LED reactors as well (the inlet/outlet directions may be different). The straight black arrows indicate the main direction of the flow, as well as the main direction of inlet flow and outlet flow of the reactors. Referring to the invention in FIG. 22A, there is shown the side views of a UV-LED reactor having a rigid body 1191, UV-LEDs 1192, and quartz windows 1193. Referring to the invention in FIG. 22B, there is shown the side views of a UV-LED reactor having a rigid body 1194, UV-LEDs 1195, and quartz windows 1196. Referring to the invention in FIG. 22C, there is shown the side views of a UV-LED reactor having a rigid body 2101, UV-LEDs 2102, quartz windows 2103, and static mixer 2104. The curved black arrows indicate mixing of the fluid after passing through the static mixer. The mixer is applied for the enhancement of mixing and the generation of potential vortices for the improvement of the UV-LED reactor hydrodynamics. Referring to the invention in FIG. 22D, there is shown the side views of a UV-LED reactor having a rigid body 2111, UV-LEDs 2112, quartz windows 2113, and photocatalyst immobilized on a support structure 2114.

Figure 22A:
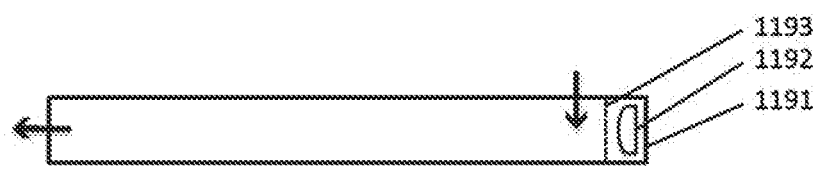
FIGS. 22A-E are side views of several single channel UV-LED reactor configurations of the present invention, where the LED is positioned at one end of the flow channel (FIG. 22A), a UV-LED reactor where the LEDs are positioned at both ends of the flow channel (FIG. 22B), a UV-LED reactor with a static mixer (FIG. 22C), a UV-LED reactor with a photocatalyst structures at the top and bottom of the flow channel (FIG. 22D), a UV-LED reactor with photocatalyst on perforated structures (FIG. 22E)
Figure 22B:
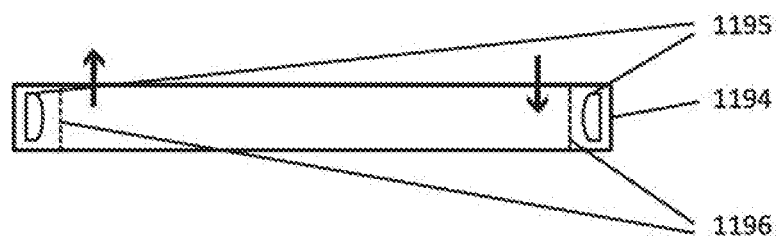
Figure 22C:
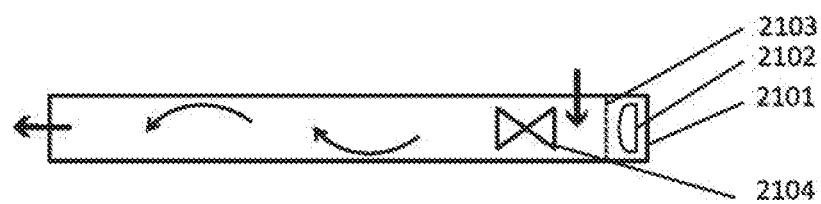
Figure 22D:
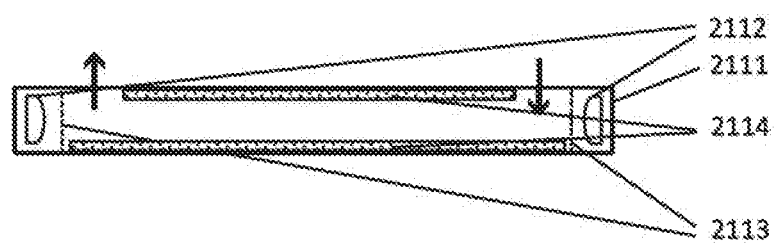
Figure 22E:
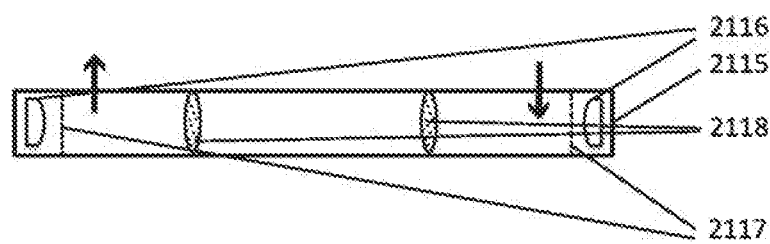

Referring to the invention in FIG. 22E, there is shown the side views of a UV-LED reactor having a rigid body 2115, UV-LEDs 2116, quartz windows 2117, and photocatalyst immobilized on a perforated support structure 2118. The photocatalyst is activated by UV radiation from UV-LEDs to initiate photocatalytic reactions such as photo-initiated oxidation.

Figure 23:
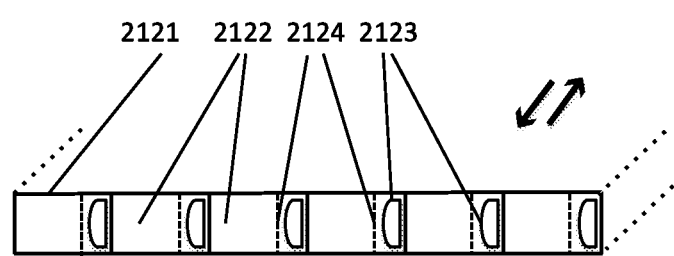
FIG. 23 is a side view of a UV-LED reactor, where most of LEDs are positioned between two adjacent flow channels of the present invention; the dotted lines show the third dimension.

Referring now to the invention in FIG. 23, there is shown the side view of (with the dotted lines showing the third dimension) a UV-LED reactor comprising a series of UV-LED flow channels, having a rigid body 2121, flow channels 2122, UV-LEDs 2123, and quartz windows 2124. The main direction of the radiation is perpendicular to the main direction of the flow. The fluid is irradiated by LEDs, as it flows in the channels. The fluid flow may also removes the heat generated by LEDs. Most of LEDs are positioned between two adjacent flow channels. The fluid on one side (the side facing the front of LEDs, where there is a quartz window) is irradiated by LEDs and the fluid on the other side (the side facing the rear of LEDs) removes the heat generated by LEDs. This design makes possible manufacturing of slim UV-LED reactors with efficient thermal management. The main fluid flow directions are shown by the arrows. In FIGS. 21A-E, only LEDs on the side view are shown; more LEDs may be placed in each flow channel side-by-side in the third direction of the reactor (the main direction of fluid flow).

Figure 24A:
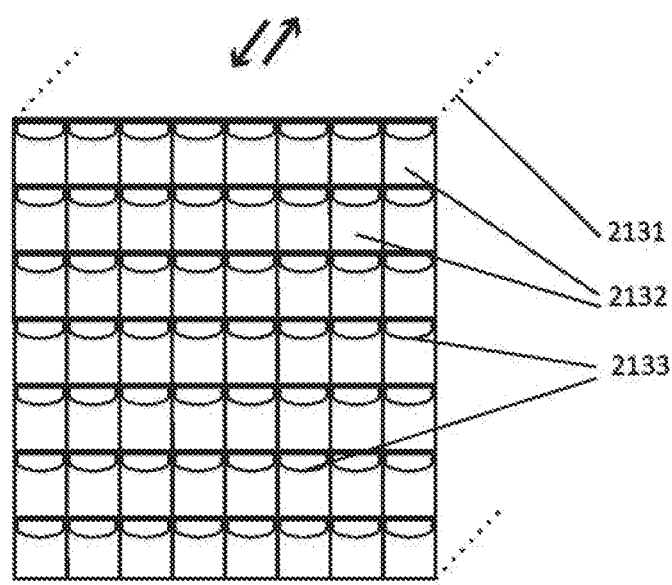
FIGS. 24A and 24B are side views of UV-LED reactors, where stacks of rectangular (FIG. 24A) and triangular (FIG. 24B) flow channels are irradiated by LEDs perpendicular to the direction of the flow, of the present invention; the dotted lines show the third dimension.
Figure 24B:
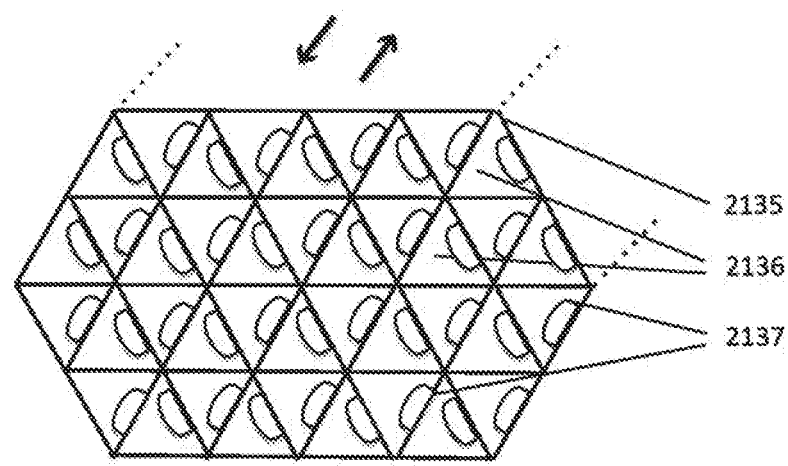

Referring now to the invention in FIGS. 24A-B, there is shown the side view of (with the dotted lines showing the third dimension) a UV-LED reactor comprising a stack of UV-LED flow channels, having a rigid body 2131 and 2135, flow channels 2132 and 2136, and UV-LEDs 2133 and 2137 (other components including quartz windows, etc. are not shown for making the figure simple). The main direction of the radiation is perpendicular to the main direction of the flow. The fluid is irradiated by LEDs, as it flows in the channels. The fluid flow may also removes the heat generated by LEDs. Most of LEDs are positioned between two adjacent flow channels. The fluid on one side (the side facing the front of LEDs, where there is a quartz window) is irradiated by LEDs and the fluid on the other side (the side facing the rear of LEDs) removes the heat generated by LEDs. This design makes possible manufacturing of UV-LED reactors with the potential of delivering high UV fluence (dose) and/or high throughput. The flow channel cross section may be rectangular (FIG. 24A), triangular (FIG. 24B), or other shapes. The main fluid flow directions are shown by the arrows. In FIGS. 24A-B, only LEDs on the side view are shown; more LEDs may be placed in each flow channel side-by-side in the third direction of the reactor (the main direction of fluid flow).

Figure 25A:
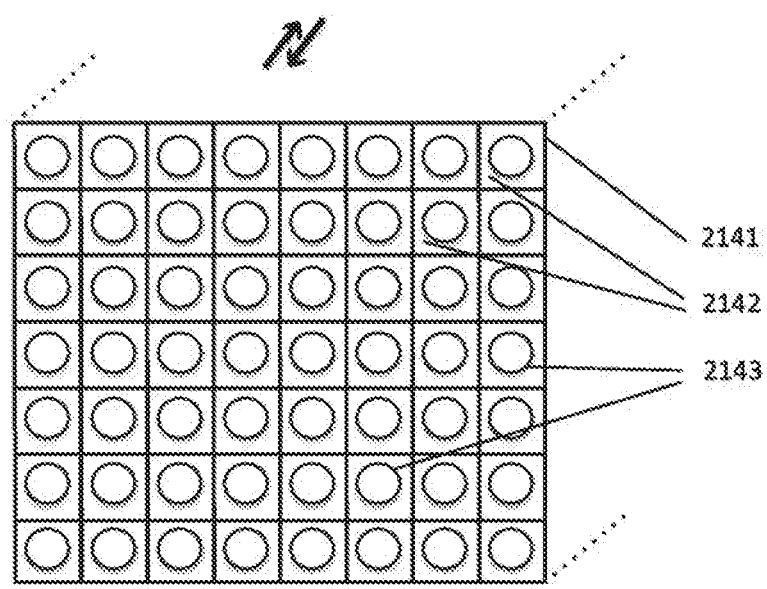
Figure 25B:
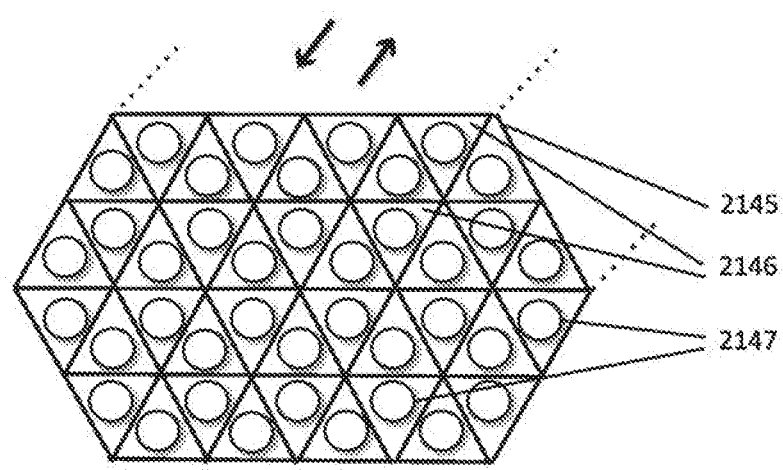

Referring now to the invention in FIGS. 25A-B, there is shown the side view of (with the dotted lines showing the third dimension) a UV-LED reactor comprising a stack of UV-LED flow channels, having a rigid body 2141 and 2145, flow channels 2142 and 2146, and UV-LEDs 2143 and 2147 (other components including quartz windows, etc. are not shown for making the figure simple). The main direction of the radiation is parallel to the main direction of the flow. The fluid is irradiated by LEDs, as it flows in the channels. The fluid flow may also removes the heat generated by LEDs. This design makes possible manufacturing of UV-LED reactors with the potential of delivering high UV fluence (dose) and/or high throughput. The flow channel cross section may be rectangular (FIG. 25A), triangular (FIG. 25B), or other shapes. The main fluid flow directions are shown by the arrows. In FIGS. 25A-B, Only LEDs on the side view are shown; more LEDs may be placed in each flow channel side-by-side in the third direction of the reactor (the main direction of fluid flow).

Figure 26:
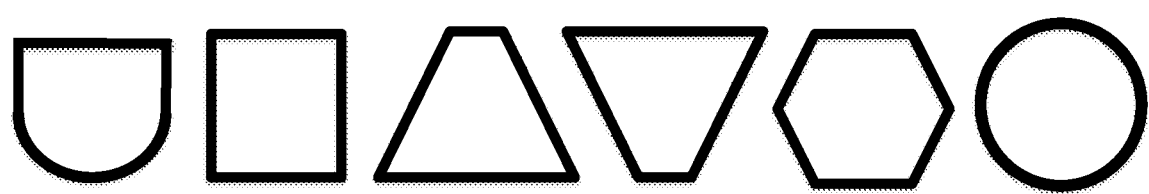
FIG. 26 is a side view of several different shapes of the flow channel cross sections of the UV-LED reactors of the present invention.

Referring now to FIG. 26, there are shown several different shapes of the flow channel cross sections. The UV-LED reactors described in FIGS. 14A to 25B may have any form of flow channel cross section shapes such as circular, rectangular, triangle, trapezoid, etc., including the several geometries described in FIG. 26. These flow cross sections may enhance the reactor performance by improving the reactor hydrodynamics and/or radiation distribution. For example the trapezoid cross section channel may be adjusted to the view angle of UV-LEDs for providing optimal radiation transfer to the fluid.

The construction details of the invention as shown in FIG. 15A to FIG. 26, are that the UV-LED reactor body may be made of aluminum, stainless steel, or of any other sufficiently rigid and strong material such as metal, alloy, high-strength plastic, and the like. In special cases, for example a single channel reactor similar to a pipe, it may also be made of flexible material such as UV-resistance PVC and the like. Also, the various components of the UV-LED reactor may be made of different materials. Further, photocatalyst structures may be used in the reactors, for UV-activated photocatalytic reactions. The photocatalyst may be incorporated in the reactor either by being immobilized on porous substrate, where fluid passes through, and/or by being immobilized on a solid substrate, where fluid passes over. Static mixers or other forms of flow modifiers may be applied to enhance the reactor hydrodynamics. Further, the reactors may be designed to irradiate the fluid with a combination of UV-LEDs with directions that are both perpendicular and parallel to the axis of the flow channel length (or main flow direction). Further, a combination of different design concepts may be used. For example, static mixers may be used with photocatalysts.

Figure 27:
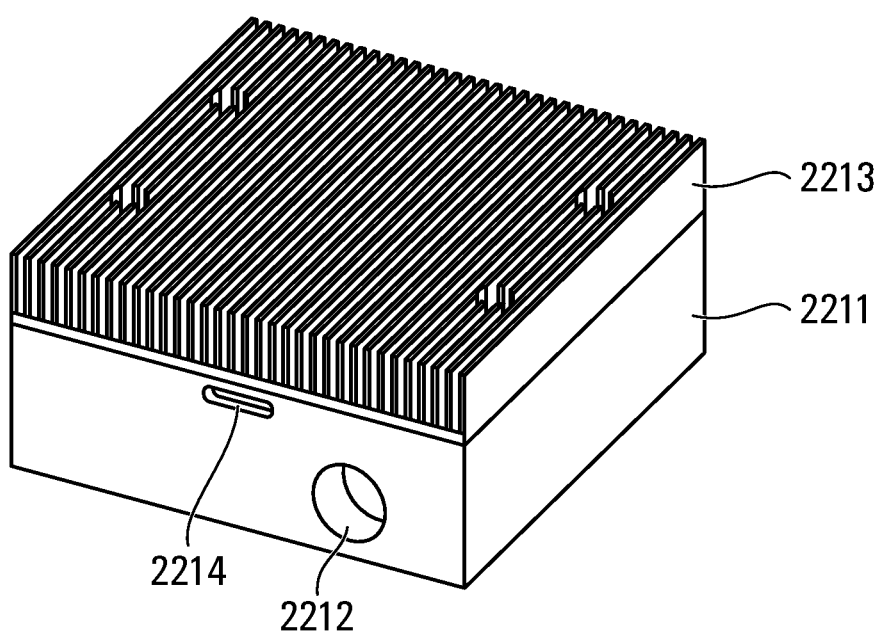
FIG. 27 is a render view of the external part of a UV-LED reactor including heat sink, where the flow channels are irradiated by LEDs parallel to the direction of the flow, of the present invention.

Referring now to the invention in FIG. 27, there is shown the render view of the external part of a UV-LED reactor, with a design concept similar to the one described in FIG. 15 and FIGS. 16A-C, having a reactor body 2211, an inlet/outlet 2212, heat sink 2213, and electrical connector slot 2214. The fluid passes through the reactor and is irradiated by LEDs (not shown) attached to a printed circuit board and located between the quartz covering the flow channels and the heat sink. The LEDs are separated from the flow channels by a quartz window (not shown).

Figure 28:
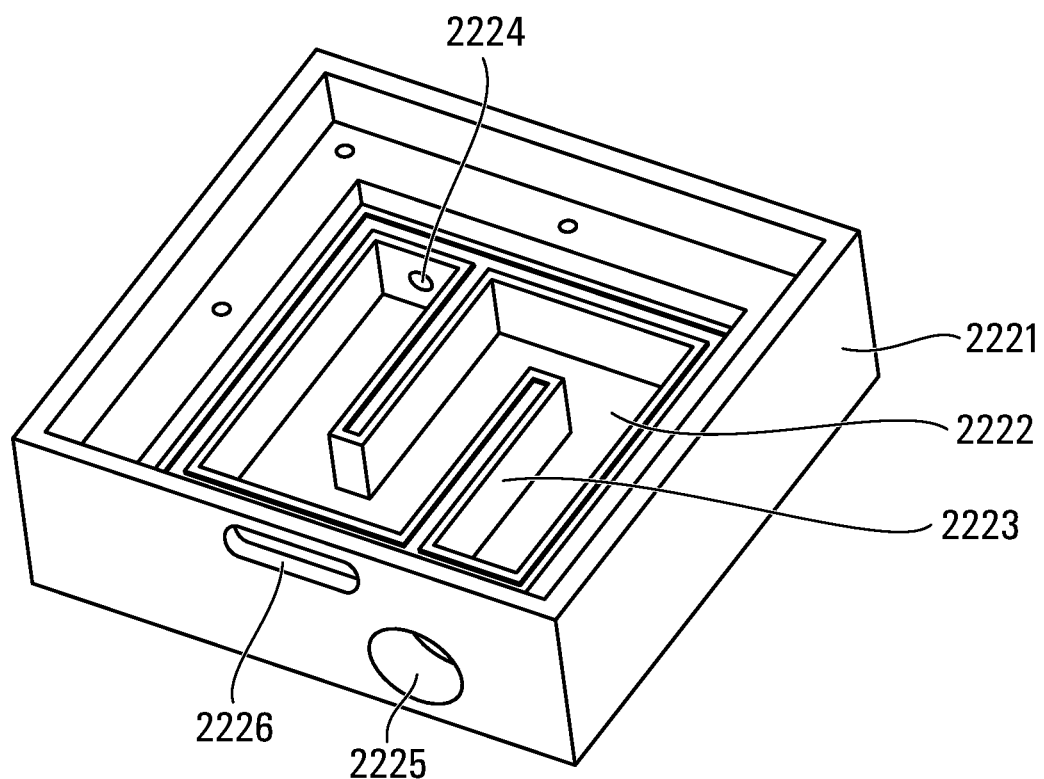
FIG. 28 is perspective view of UV-LED reactor channels shown in FIG. 27.

Referring now to the invention in FIG. 28, there is shown the perspective view of the UV-LED reactor (the one shown in FIG. 27, without LEDs and heat sink) with a design concept similar to the one described in FIG. 15 and FIGS. 16A-C, with 3 parallel channels, having a reactor body 2221, flow channel 2222 with channel wall 2223, an inlet/outlet 2224/2225, and electrical connector slot 2226. The fluid passes through the reactor and is irradiated by LEDs (not shown) attached to a board located on top of the reactor channels.

Referring now to the invention in FIG. 29, there is shown the engineering drawings of the reactor in FIG. 28, presenting the top and side views, with some potential dimensions.

Figure 30:
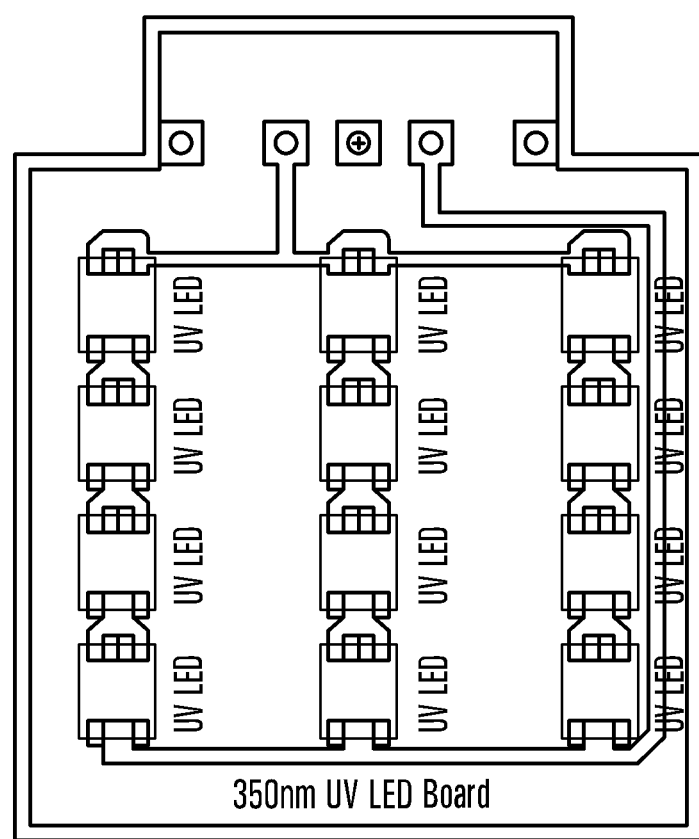
FIG. 30 is UV-LED circuit board design of the UV-LED reactor shown in FIG. 27.

Referring now to FIG. 30, there is shown the UV-LED circuit board design of the reactor shown in FIG. 28.

Figure 31:
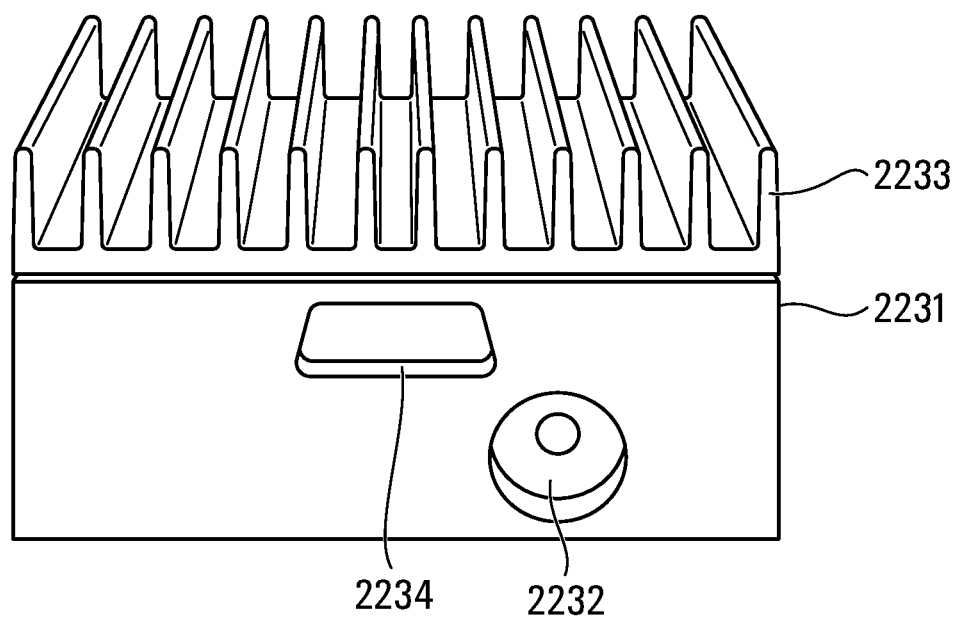
FIG. 31 is a picture of an assembled UV-LED reactor (shown in FIG. 27), of the present invention.

Referring to the invention in FIG. 31, there is shown the picture of a UV-LED reactor prototype, with a design concept similar to the one described in FIG. 15 and FIGS. 16A-C, having a reactor body 2231, an inlet/outlet 2232, heat sink 2233, and electrical connector slot 2234.

Figure 32A:
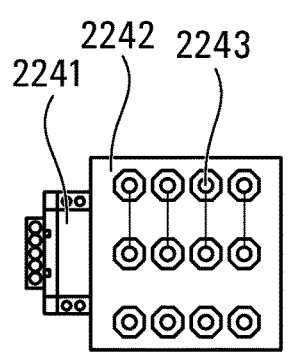
FIGS. 32A-C show a disassembled UV-LED reactor (shown in FIG. 31), of the present invention.
Figure 32B:
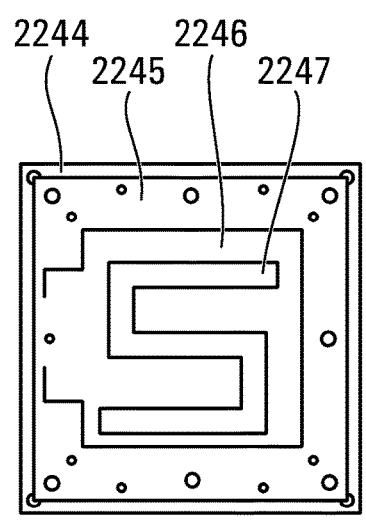
Figure 32C:
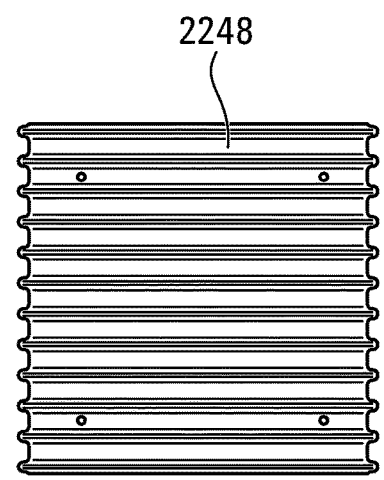

Referring now to the invention in FIGS. 32A-C, there is shown the picture of the LED board (FIG. 32A), reactor bod (FIG. 32B), and heat sink (FIG. 32C) for the UV-LED reactor with a design concept similar to the one described in FIG. 15 and FIGS. 16A-C, with 3 parallel channels. Still referring to FIGS. 32A-C, there is shown different parts of the reactor separately having electrical connector, 2241, circuit board 2242, UV-LEDs 2243, reactor body 2244, quarts window 2247 (transparent) secured on top of the flow channels by a frame 2245 and sealing 2246. The LED board is placed on top of the quartz (in reverse of the position shown in the Figure, so that the LEDs are facing the flow channel). The heat sink 2248 is placed on top of the LED circuit board to remove the heat generated by the LEDS.

Figure 33A:
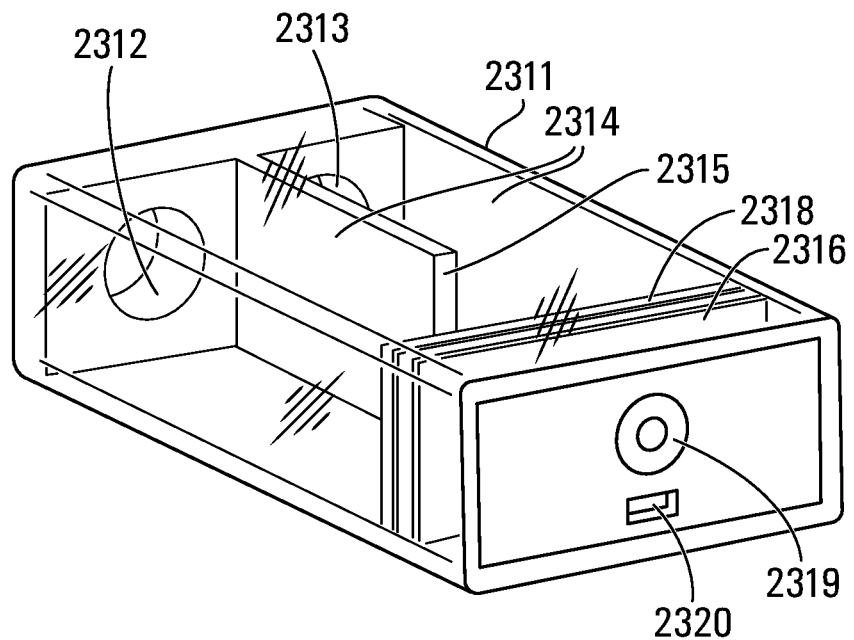
FIGS. 33A-C show the reactor (FIGS. 33A and 33B) and the reactor component (FIG. 33C) of a UV-LED reactor with two channels, where the flow channels are irradiated by LEDs parallel to the direction of the flow, of the present invention.
Figure 33B:
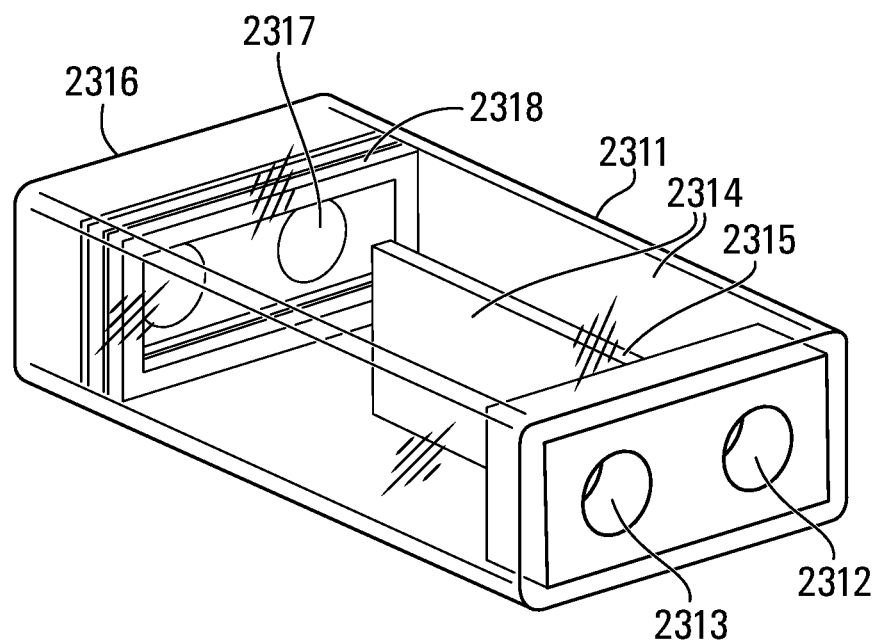
Figure 33C:
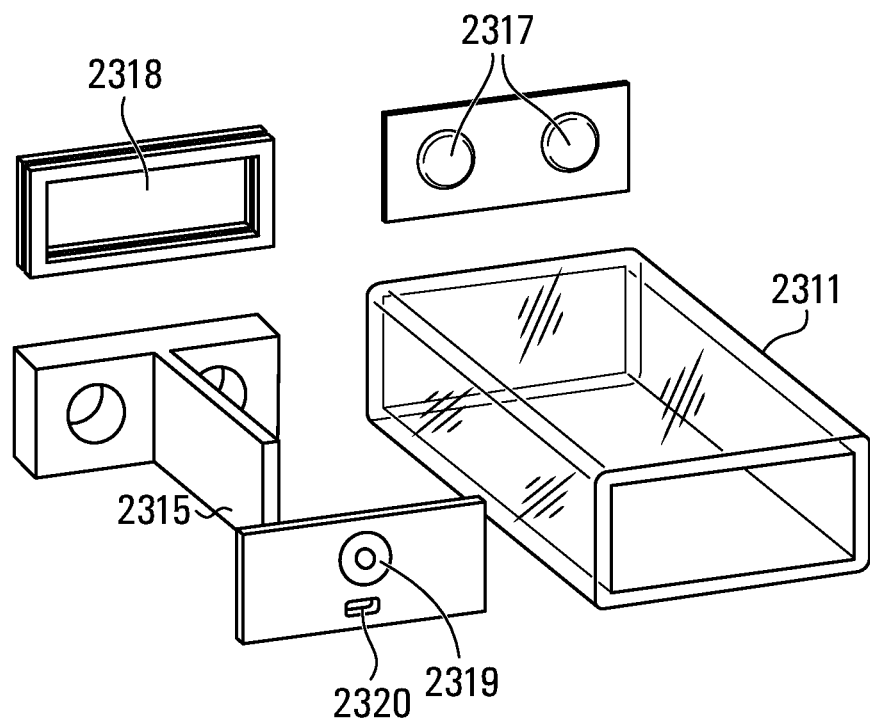

Referring now to the invention in FIGS. 33A-C, there is shown the render views of a UV-LED reactor, with a design concept similar to the one described in FIG. 17 and FIGS. 18A-C, with two parallel flow channels, having a reactor body 2311, an inlet/outlet 2312/2313, flow channel 2314 with channel wall 2315, hosing for UV-LEDs (and LED drive, and other electrical components) 2316, UV-LEDs 2317, a quartz window 2318 to separate LEDs and electrical components form the fluid, an on/off switch 2319, and an electrical connector slot 2320. The fluid passes through the reactor in the flow channels and is irradiated by LEDs attached to a printed circuit board. Different lenses (not shown; optional), such as collimating lenses may be used in front of the LEDs to modify the radiation. The lenses may be applied separately (be placed individually in front of each LED), or be integrated with LEDs (as LED lens), or be integrated within the quartz window (part of the quartz window in front of each LED has the shape of a lens).

Figure 34:
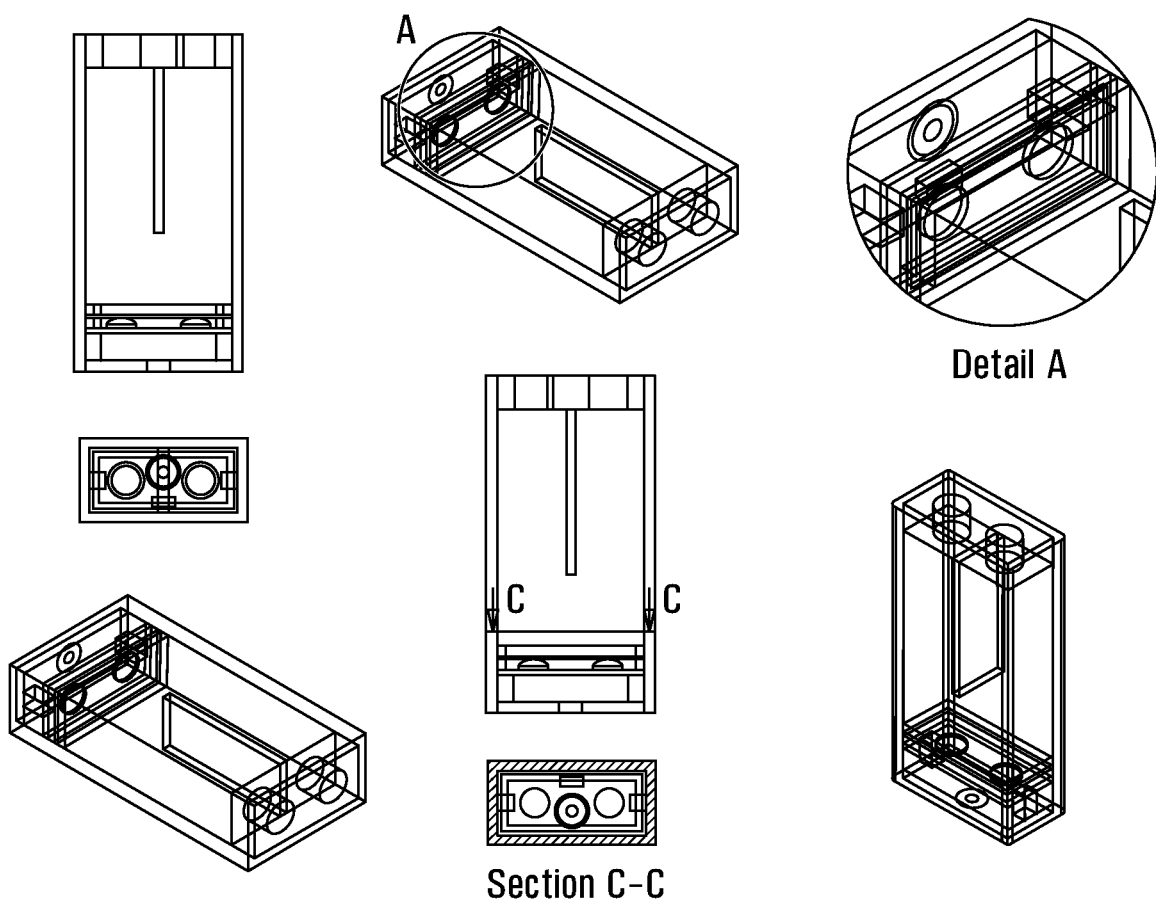
FIG. 34 is the perspective, top, and side views of the UV-LED reactor shown in FIGS. 33A-C.

Referring now to the invention in FIG. 34, there is shown different views including perspective, top, and side views of a UV-LED reactor, with a design concept similar to the one described in FIG. 17 and FIGS. 18A-C, with two parallel flow channels. This Fig. shows the same reactor presented in FIGS. 33A-C with more details.

Figure 35:
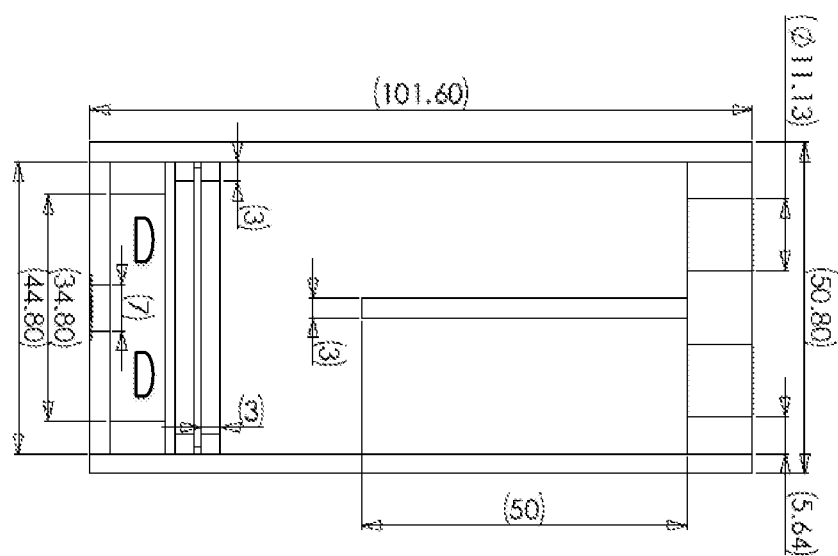
FIG. 35 is the engineering drawings of the UV-LED reactor shown in FIGS. 33A-C.

Referring now to the invention in FIG. 35, there is shown the engineering drawing of a UV-LED reactor, with a design concept similar to the one described in FIG. 17 and FIGS. 18A-C, with two parallel flow channels. This Fig. shows the same reactor presented in FIGS. 33A-C and FIG. 34 with some possible dimensions (in mm).

Figure 36:
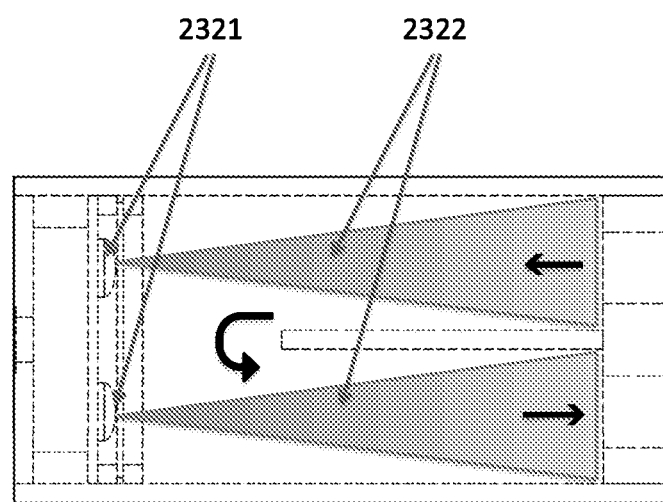
FIG. 36 is a top view of a UV-LED reactor with two channels and two LEDs emitting radiant with a relatively narrow angle of the present invention.

Referring now to the invention in FIG. 36, there is shown the top view of a UV-LED reactor, with a design concept similar to the one described in FIG. 17 and FIGS. 18A-C, with two parallel flow channels. The LEDs 2321, irradiate radiant (showing in blue) with a relatively narrow angle 2322 (LEDs with relatively small view angle). The main fluid flow directions are shown by the black arrows.

Figure 37:
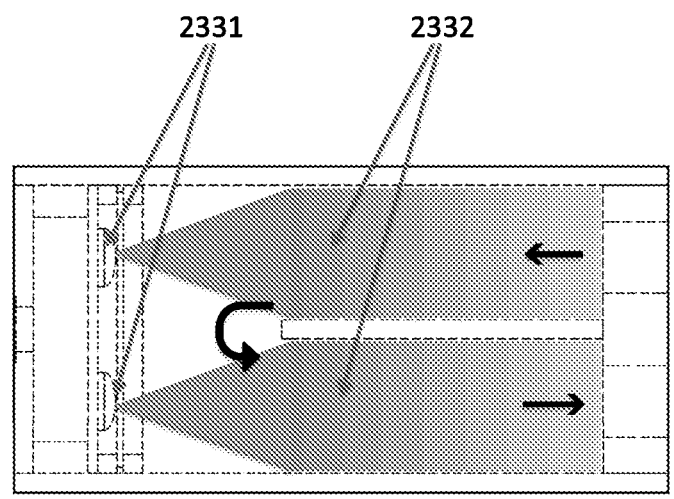
FIG. 37 is a top view of a UV-LED reactor with two channels and two UV-LEDs emitting radiant with a relatively wide angle of the present invention.

Referring now to the invention in FIG. 37, there is shown the top view of a UV-LED reactor, with a design concept similar to the one described in FIG. 17 and FIGS. 18A-C, with two parallel flow channels. The LEDs 2331 irradiate radiant (showing in blue) with a relatively wide angle 2333 (LEDs with relatively large view angle). The main fluid flow directions are shown by the black arrows. The internal wall of the channels may be made of or be coated with material with high UV reflectivity for better radiation transfer to the fluid.

Figure 38:
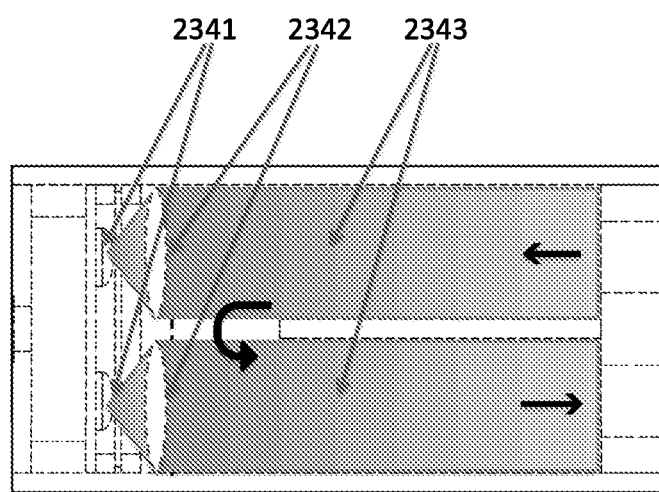
FIG. 38 is a top view of a UV-LED reactor with two channels and two UV-LEDs emitting radiant and two collimating lens for adjusting the radiant angle, of the present invention.

Referring now to the invention in FIG. 38, there is shown the top view of a UV-LED reactor, with a design concept similar to the one described in FIG. 17 and FIGS. 18A-C, with two parallel flow channels. There is a collimating lens 2342 in front of each LED 2341 to collimate the radiation (showing in blue) 2343. This will result in a more uniform distribution of radiation in the UV-LED reactor, thereby increasing the reactor performance. The main fluid flow directions are shown by the black arrows.

The advantages of the present invention include, without limitation, that it is an efficient compact UV-LED reactor that can be applied for any UV-activated photolytic and photocatalytic reactions. One of such applications is water purification. The proposed UV-LED reactor comprises a series of specifically designed flow channels and a specially positioned array of UV LEDs. These particular configurations offer precise control of both the fluidic and optical environments. Further, the reactor concepts presented in this invention, which can be optimized based on a combination of UV-LED radiation pattern and the flow field hydrodynamics, provides superior UV dose delivery to the fluid. Further these configurations make the design of a small UV reactor with all-integrated components possible. Other advantages of the device include robust design, lower voltages and power requirements, and the ability to turn on/off automatically and with high frequency. These features can result in the operation of this UV-LED reactor concept for applications where UV-Lamp reactors cannot be used. In one variation of this design concept, the fluid flow is used for removing the heat generated by UV-LEDs. The advantage of this design concept is manufacturing of slim UV-LED reactors with efficient thermal management. Further, the photoreactor concept can be applied to both UV photolytic and photocatalytic reactors for water purification.

Further advantages of the present invention are that it is a simple, compact and modular water disinfection device suitable for processing low to moderate volumes of water—ideally suited for point-of-use applications. Further, the present invention may be incorporated in appliances, particularly refrigerators, freezers, water coolers, coffee machines, or any other kind of water dispensers or icemakers. Further, the present invention may be incorporated in dental units such as a dental chair for dental work (filling, operation, etc.). Further, the present invention may be incorporated in healthcare facilities or medical devices using water for operation and/or cleaning, such as hemodialysis machines.

In broad embodiment, the present invention is an efficient and compact UV-LED reactor applicable to a range photolytic and photocatalytic reactions including water treatment.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A method of directing ultraviolet (UV) radiation into at least a portion of at least one photoreaction chamber of a photoreactor apparatus, the method comprising:
   causing a first at least one optical component to refract at least some of the UV radiation onto at least a portion of a curved surface of a second at least one optical component; and
   causing the second at least one optical component to direct, into the at least a portion of the at least one photoreaction chamber, at least some of the UV radiation refracted by the first at least one optical component and onto the at least a portion of the curved surface of the second at least one optical component.

2. A photoreactor apparatus comprising:
   a housing defining, at least, a fluid inlet, a fluid outlet, and at least one photoreaction chamber in fluid communication with the fluid inlet and the fluid outlet;
   at least one UV-radiation emitter;
   a first at least one optical component; and
   a second at least one optical component comprising a curved surface;
   the at least one UV-radiation emitter operable and positioned to direct at least some UV radiation onto at least a portion of the first at least one optical component;
   the first at least one optical component operable and positioned to refract, onto at least a portion of the curved surface of the second optical component, at least some of the UV radiation directed by the at least one UV-radiation emitter and onto the at least a portion of the first at least one optical component; and
   the second at least one optical component operable and positioned to direct, into at least a portion of the at least one photoreaction chamber, at least some of the UV radiation refracted by the first at least one optical component and onto the at least a portion of the curved surface of the second at least one optical component.

3. A photoreactor apparatus comprising:
   a housing defining, at least, a fluid inlet, a fluid outlet, and at least one photoreaction chamber in fluid communication with the fluid inlet and the fluid outlet;
   at least one UV-radiation emitter;
   a first at least one optical component; and
   a second at least one optical component;
   the at least one UV-radiation emitter operable and positioned to direct at least some UV radiation onto at least a portion of the first at least one optical component;
   the first at least one optical component operable and positioned to refract, onto at least a portion of the second optical component, at least some of the UV radiation directed by the at least one UV-radiation emitter and onto the at least a portion of the first at least one optical component; and
   the second at least one optical component operable and positioned to direct, into at least a portion of the at least one photoreaction chamber, at least some of the UV radiation refracted by the first at least one optical component and onto the at least a portion of the second at least one optical component;
   wherein the first at least one optical component comprises at least one lens operable and positioned to converge the at least some of the UV radiation directed by the at least one UV-radiation emitter and onto the at least a portion of the first at least one optical component.

4. The apparatus of claim 2 wherein the first at least one optical component comprises at least one planar face.

5. A photoreactor apparatus comprising:
   a housing defining, at least, a fluid inlet, a fluid outlet, and at least one photoreaction chamber in fluid communication with the fluid inlet and the fluid outlet;
   at least one UV-radiation emitter;
   a first at least one optical component; and
   a second at least one optical component;
   the at least one UV-radiation emitter operable and positioned to direct at least some UV radiation onto at least a portion of the first at least one optical component;
   the first at least one optical component operable and positioned to refract, onto at least a portion of the second optical component, at least some of the UV radiation directed by the at least one UV-radiation emitter and onto the at least a portion of the first at least one optical component; and
   the second at least one optical component operable and positioned to direct, into at least a portion of the at least one photoreaction chamber, at least some of the UV radiation refracted by the first at least one optical component and onto the at least a portion of the second at least one optical component;
   wherein the second at least one optical component comprises at least one lens operable and positioned to refract the at least some of the UV radiation refracted by the first at least one optical component and onto the at least a portion of the second at least one optical component.

6. The apparatus of claim 5 wherein the at least one lens is operable and positioned to converge the at least some of the UV radiation refracted by the first at least one optical component and onto the at least a portion of the second at least one optical component.

7. The apparatus of claim 5 wherein the at least one lens is operable and positioned to collimate the at least some of the UV radiation refracted by the first at least one optical component and onto the at least a portion of the second at least one optical component.

8. The apparatus of claim 2 wherein the second at least one optical component comprises at least one planar face.

9. The apparatus of claim 3 wherein the first at least one optical component comprises a converging lens.

10. The apparatus of claim 2 wherein the at least one UV-radiation emitter comprises a UV-light-emitting diode (UV-LED).

11. The apparatus of claim 2 wherein:
    the at least one photoreaction chamber comprises a fluid conduit having a longitudinal fluid flow direction; and
    the second at least one optical component is operable and positioned to direct the at least some of the UV radiation refracted by the first at least one optical component and onto the at least a portion of the second at least one optical component along the longitudinal fluid flow direction of the fluid conduit.

12. A method of directing UV radiation into at least a portion of at least one photoreaction chamber of a photoreactor apparatus, the method comprising:
    causing at least one optical component to direct at least some of the UV radiation into, at least:
    at least a portion of a first fluid flow channel of the at least one photoreaction chamber; and
    at least a portion of a second fluid flow channel of the at least one photoreaction chamber;

the at least one photoreaction chamber in fluid communication with, at least, a fluid inlet and a fluid outlet of the photoreactor apparatus;

the first fluid flow channel extending between, at least, the fluid inlet and an intermediate fluid flow region along a fluid flow path between the first fluid flow channel and the second fluid flow channel, wherein the first fluid flow channel extends, at least, from the fluid inlet to the intermediate fluid flow region in a first longitudinal direction relative to the photoreactor apparatus;

the second fluid flow channel separated from the first fluid flow channel and extending between, at least, the intermediate fluid flow region and the fluid outlet, wherein the second fluid flow channel extends, at least, from the intermediate fluid flow region to the fluid outlet in a second longitudinal direction relative to the photoreactor apparatus and opposite the first longitudinal direction; and the intermediate fluid flow region configured to direct:
fluid received from the first fluid flow channel into only the second fluid flow channel; and
into the second fluid flow channel, only the fluid received from the first fluid flow channel;

wherein causing the at least one optical component to direct the at least some of the UV radiation comprises causing the at least one optical component to direct the at least some of the UV radiation into, at least:
the at least a portion of the first fluid flow channel along the first longitudinal direction; and
the at least a portion of the second fluid flow channel along the second longitudinal direction.

13. The method of claim 12 further comprising causing the at least one optical component to direct at least some of the UV radiation into at least a portion of the intermediate fluid flow region.

14. A photoreactor apparatus comprising:
a housing defining, at least, a fluid inlet, a fluid outlet, and at least one photoreaction chamber in fluid communication with the fluid inlet and the fluid outlet;
at least one UV-radiation emitter; and
at least one optical component;
the at least one UV-radiation emitter operable and positioned to direct at least some UV radiation onto at least a portion of the at least one optical component;
the at least one photoreaction chamber comprising:
a first fluid flow channel;
a second fluid flow channel separated from the first fluid flow channel; and
an intermediate fluid flow region along a fluid flow path between the first and second fluid flow channels, wherein the intermediate fluid flow region is configured to direct:
fluid received from the first fluid flow channel into only the second fluid flow channel; and
into the second fluid flow channel, only the fluid received from the first fluid flow channel;

the first fluid flow channel extending between, at least, the fluid inlet and the intermediate fluid flow region, wherein the first fluid flow channel extends, at least, from the fluid inlet to the intermediate fluid flow region in a first longitudinal direction relative to the housing;

the second fluid flow channel extending between, at least, the intermediate fluid flow region and the fluid outlet, wherein the second fluid flow channel extends, at least, from the intermediate fluid flow region to the fluid outlet in a second longitudinal direction relative to the housing and opposite the first longitudinal direction;

the at least one optical component operable and positioned to direct, into at least a portion of the first fluid flow channel and into at least a portion of the second fluid flow channel, at least some of the UV radiation directed by the at least one UV-radiation emitter and onto the at least a portion of the at least one optical component; and the at least one optical component operable and positioned to direct the at least some of the UV radiation directed by the at least one UV-radiation emitter and onto the at least a portion of the at least one optical component into, at least:
the at least a portion of the first fluid flow channel along the first longitudinal direction; and
the at least a portion of the second fluid flow channel along the second longitudinal direction.

15. The apparatus of claim 14 wherein the at least one optical component is operable and positioned to direct at least some of the UV radiation directed by the at least one UV-radiation emitter and onto the at least one optical component into at least a portion of the intermediate fluid flow region.

16. The apparatus of claim 14 wherein the at least one optical component comprises at least one planar face.

17. The apparatus of claim 14 wherein the at least one optical component comprises a UV-transmissive window.

18. The apparatus of claim 14 wherein the at least one UV-radiation emitter comprises a UV-LED.

19. The method of claim 1 wherein:
the second at least one optical component comprises at least one lens comprising the curved surface; and
causing the second at least one optical component to direct the at least some of the UV radiation comprises causing the at least one lens to refract, into the at least a portion of the at least one photoreaction chamber, the at least some of the UV radiation refracted by the first at least one optical component and onto the at least a portion of the curved surface.

20. The apparatus of claim 9 wherein the second at least one optical component comprises a UV-transmissive window.

* * * * *